(12) United States Patent
Pillsbury, IV et al.

(10) Patent No.: US 7,464,959 B2
(45) Date of Patent: Dec. 16, 2008

(54) APPARATUS HAVING A MECHANISM FOR LIMITING THE MOVEMENT OF AN AIR BAG MODULE RELATIVE TO A STEERING WHEEL

(75) Inventors: Charles S. Pillsbury, IV, Rochester Hills, MI (US); Arnold J. Herberg, Davisburg, MI (US); Neil G. Murray, Jr., Wixom, MI (US); Evgeny I. Rivin, West Bloomfield, MI (US); Victor R. Fey, West Bloomfield, MI (US); Ying-Kuo Lee, Troy, MI (US); Jagan Kumar Surendran, Sterling Heights, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 528 days.

(21) Appl. No.: 11/069,456

(22) Filed: Mar. 1, 2005

(65) Prior Publication Data
US 2006/0197323 A1    Sep. 7, 2006

(51) Int. Cl.
*B60R 21/203*    (2006.01)
(52) U.S. Cl. .................. 280/731; 280/728.2; 200/61.55
(58) Field of Classification Search .............. 280/728.2, 280/731; 200/61.55, 61.54
See application file for complete search history.

(56) References Cited

U.S. PATENT DOCUMENTS

| 5,738,369 | A  | * | 4/1998  | Durrani ....................... 280/731 |
| 6,457,379 | B1 | * | 10/2002 | Mirone ......................... 74/552 |
| 6,592,141 | B1 | * | 7/2003  | Dancasius et al. ......... 280/728.2 |
| 6,719,324 | B2 | * | 4/2004  | Albers et al. ................. 280/731 |
| 6,871,870 | B2 | * | 3/2005  | Schneider et al. ......... 280/728.2 |
| 6,874,808 | B2 | * | 4/2005  | Marath et al. ............ 280/728.2 |
| 2001/0050473 | A1 | * | 12/2001 | Fujita ......................... 280/731 |
| 2005/0017484 | A1 | * | 1/2005  | Worrell et al. .............. 280/731 |
| 2005/0151354 | A1 | * | 7/2005  | Sugimoto ................... 280/731 |
| 2006/0113775 | A1 | * | 6/2006  | Hirzmann et al. ........... 280/731 |

* cited by examiner

*Primary Examiner*—Ruth Ilan
(74) *Attorney, Agent, or Firm*—Tarolli, Sundheim, Covell & Tummino LLP

(57) ABSTRACT

An apparatus (10) for a vehicle includes a steering wheel (12) and a vehicle occupant protection device (14) that is mounted to the steering wheel (12) and is actuatable for helping to protect an occupant of the vehicle. At least a portion of the vehicle occupant protection device (14) is movable relative to the steering wheel (12) for actuating an electric device (108) associated with the vehicle when a force is applied to any one of various locations on the vehicle occupant protection device (14). The apparatus (10) also includes a mechanism (104) for substantially blocking tilt of the movable portion of the vehicle occupant protection device (14) relative to the steering wheel (12) during movement for actuating the electric device (108).

15 Claims, 10 Drawing Sheets

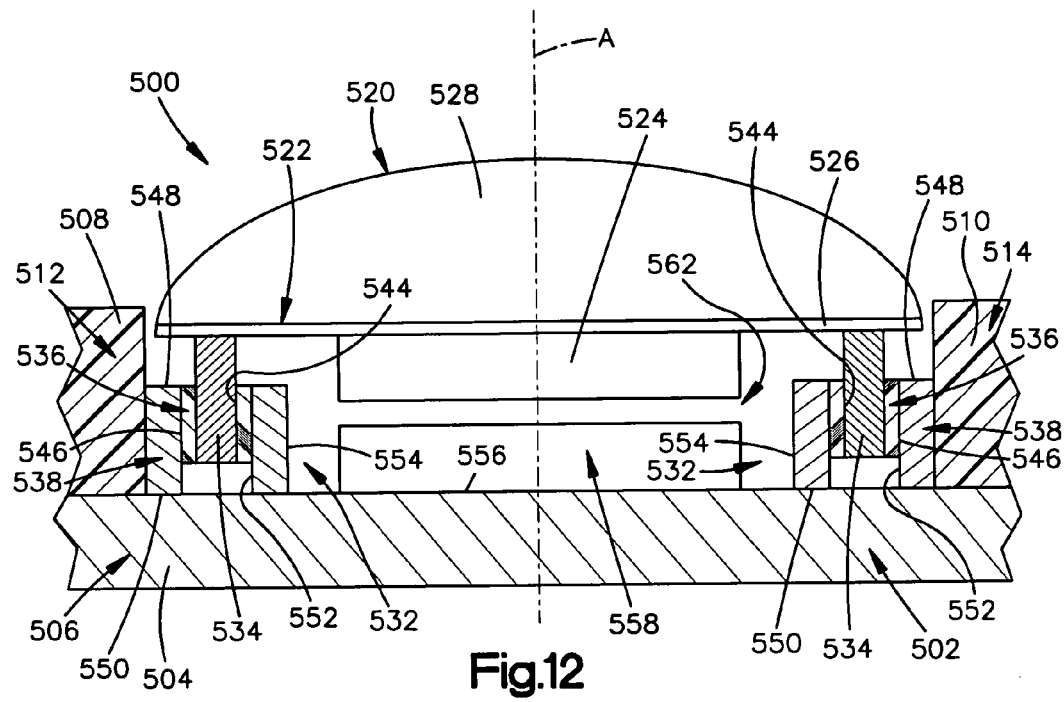
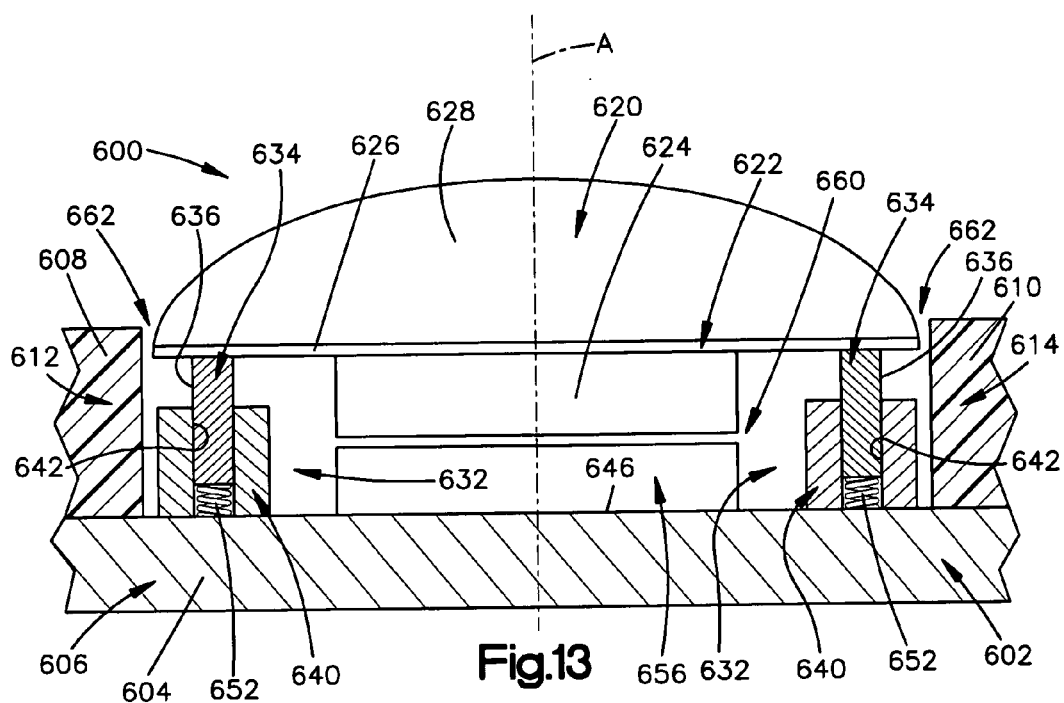

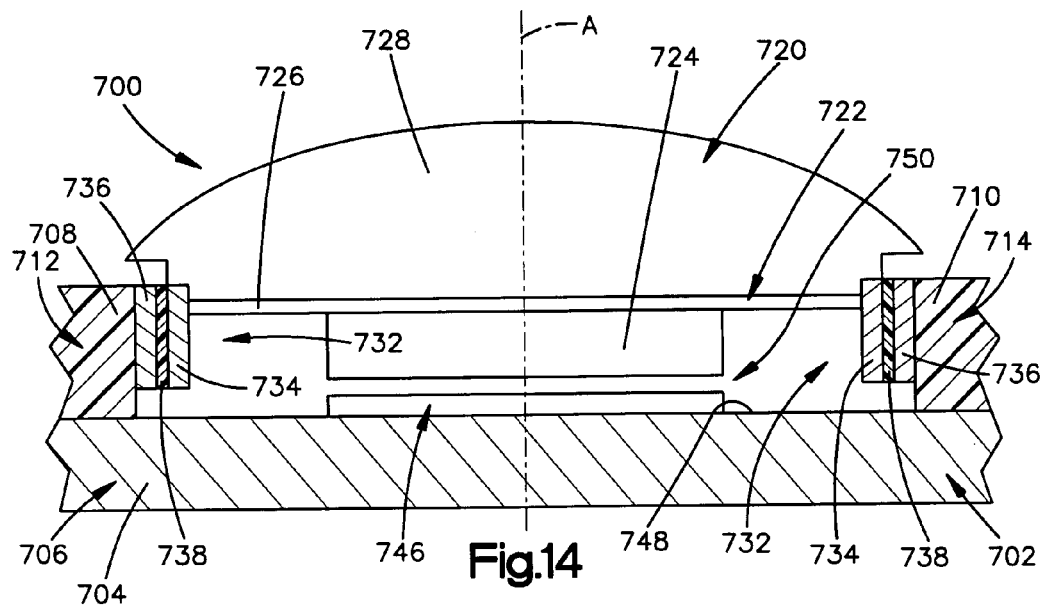

APPARATUS HAVING A MECHANISM FOR LIMITING THE MOVEMENT OF AN AIR BAG MODULE RELATIVE TO A STEERING WHEEL

TECHNICAL FIELD

The present invention relates to an apparatus having a mechanism that substantially blocks tilting of an air bag module relative to a steering wheel when the air bag module is pressed for actuating a vehicle horn.

BACKGROUND OF THE INVENTION

It is known to attach an air bag module to the hub portion of a vehicle steering wheel. Often, the air bag module can be pressed downward relative to the steering wheel to actuate a vehicle horn. In such systems, it is desirable that the vehicle horn be actuated regardless of the location on the air bag module at which a downward force is applied. It is common for the air bag module to become tilted relative to the steering wheel when pressed downward at a location adjacent an edge of the air bag module. Gaps between the air bag module and the surrounding structure of the steering wheel must be maintained large enough to permit the air bag module to actuate the vehicle horn when the air bag module tilts.

It is desirable to reduce the size of the gaps between the air bag module and the surrounding structure of the steering wheel. The reduction in size of the gaps, however, must not obstruct the downward movement of the air bag module relative to the steering wheel for actuating the vehicle horn. Reducing the tendency of the air bag module to tilt relative to the steering wheel enables the gaps to be reduced in size.

It is also desirable for the vehicle horn to be actuated by a substantially uniform downward force regardless of the location on the air bag module at which the downward force is applied. For example, it is desirable for the downward force necessary to actuate the vehicle horn when the force is applied at an edge of the air bag module to be substantially equal to the downward force necessary to actuate the vehicle horn when the force is applied at a central location of the air bag module. This also may be accomplished by reducing the tendency of the air bag module to tilt relative to the steering wheel. When the tendency of the air bag module to tilt is reduced, a downward force that is applied, for example, at an edge of the air bag module tends to remain directed substantially downward and less of the force is directed transverse to the downward direction. As a result, the downward force necessary to actuate the vehicle horn becomes substantially equal regardless of the location on the air bag module at which the downward force is applied.

SUMMARY OF THE INVENTION

The present invention relates to an apparatus for a vehicle. The apparatus comprises a steering wheel and a vehicle occupant protection device that is mounted to the steering wheel and that is actuatable for helping to protect an occupant of the vehicle. At least a portion of the vehicle occupant protection device is movable relative to the steering wheel for actuating an electric device associated with the vehicle when a force is applied at any one of various locations on the vehicle occupant protection device. The apparatus also comprises a mechanism for substantially blocking tilt of the movable portion of the vehicle occupant protection device relative to the steering wheel during movement for actuating the electric device.

According to another aspect, the present invention relates to an apparatus for a vehicle. The apparatus comprises a steering wheel and a vehicle occupant protection device that is mounted to the steering wheel and that is actuatable for helping to protect an occupant of the vehicle. At least a portion of the vehicle occupant protection device is movable relative to the steering wheel for actuating an electric device associated with the vehicle. The apparatus also comprises at least one mechanism for limiting movement of the movable portion of the vehicle occupant protection device relative to the steering wheel to substantially linear movement.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 12 is a view, partially in section, of a portion of an apparatus constructed in accordance with a sixth embodiment of the present invention and illustrated in a first position;

FIG. 13 is a view, partially in section, of a portion of an apparatus constructed in accordance with a seventh embodiment of the present invention and illustrated in a first position;

FIG. 14 is a view, partially in section, of a portion of an apparatus constructed in accordance with an eighth embodiment of the present invention and illustrated in a first position;

FIG. 15 is a view, partially in section, of a portion of an apparatus constructed in accordance with a ninth embodiment of the present invention and illustrated in a first position;

DETAILED DESCRIPTION OF THE INVENTION

Figure 1:
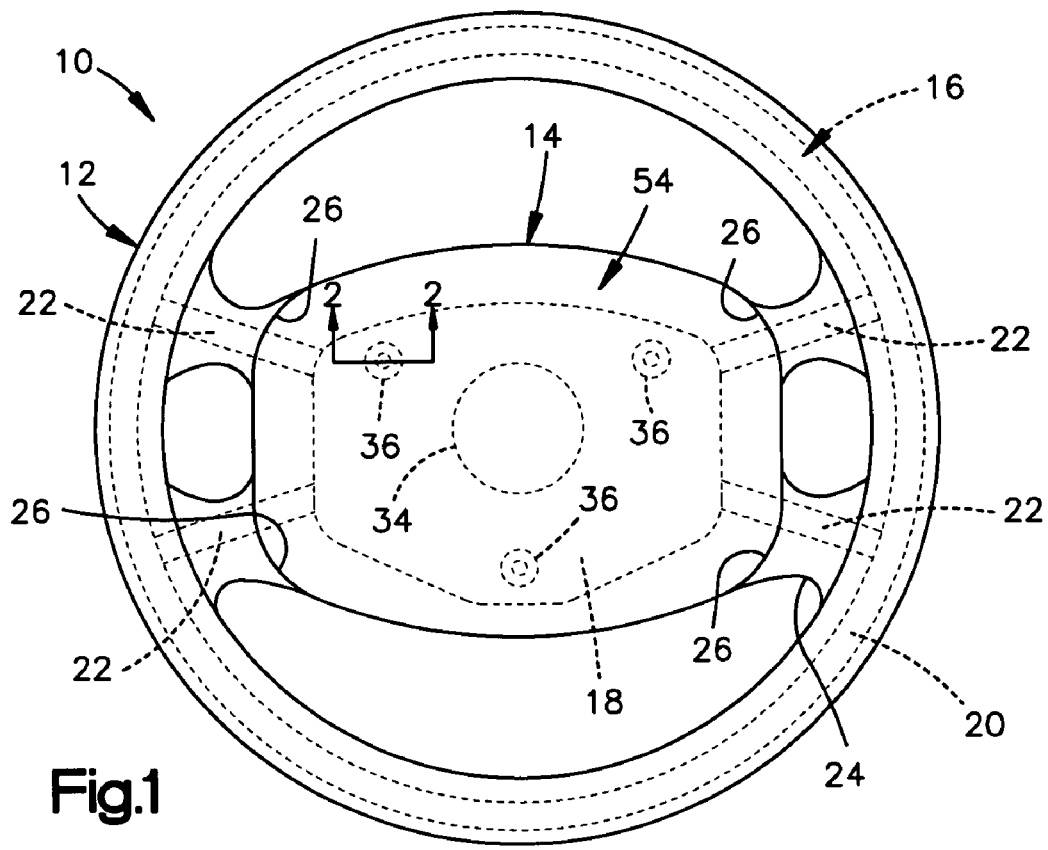
FIG. 1 is a plan view of an apparatus constructed in accordance with the present invention.

FIG. 1 is a plan view of an apparatus 10 constructed in accordance with the present invention. The apparatus 10 includes a steering wheel 12 and a vehicle occupant protection device 14.

The steering wheel 12 includes a steering wheel armature 16, shown by dashed lines in FIG. 1. Preferably, the armature 16 is made of a metallic material, such as aluminum or magnesium. The armature 16 includes a hub portion 18, an annular rim portion 20 that extends circumferentially around the hub portion, and a plurality of spokes 22 that connect the rim portion to the hub portion. The armature 16 of the steering wheel 12 illustrated in FIG. 1 includes four spokes 22.

The rim portion 20 and the spokes 22 of the armature 16 are covered with polyurethane foam 23 and an outer covering 24. The outer covering 24 is preferably leather or a leather-like material. Curved inner surfaces 26 of the covering 24 in the area of the spokes 22 define a central cavity in the steering wheel 12. The hub portion 18 of the armature 16 defines the bottom of the central cavity. The central cavity is sized for receiving the vehicle occupant protection device 14.

Figure 2:
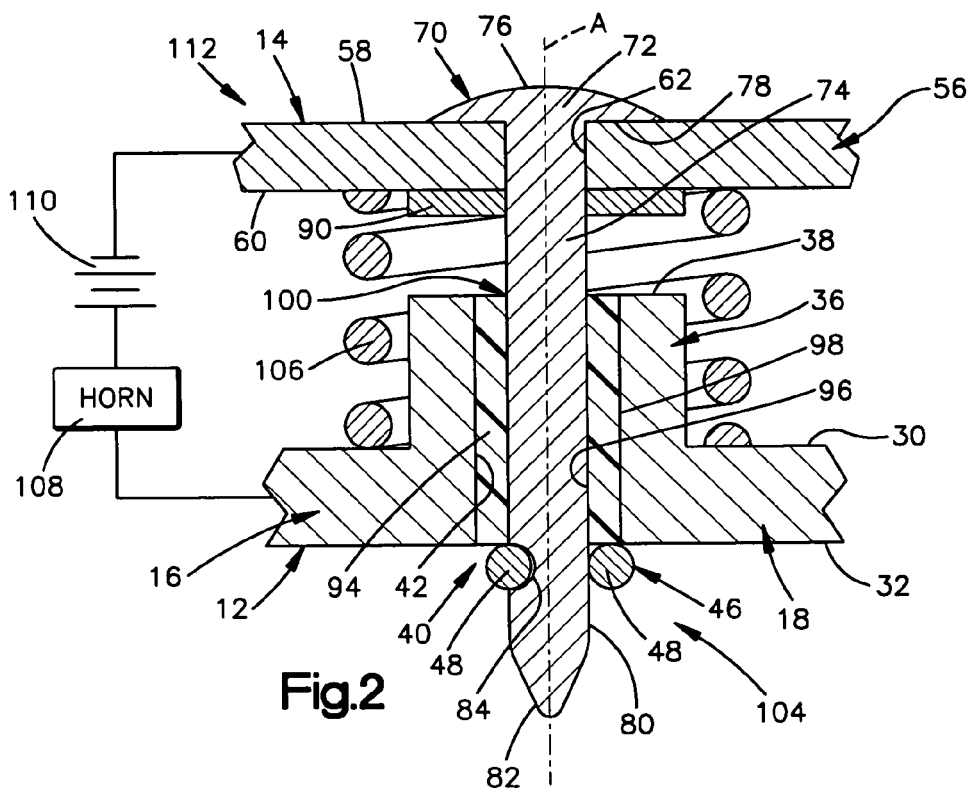
FIG. 2 is a view taken along line 2-2 in FIG. 1 and illustrates a portion of the apparatus of FIG. 1 in a first position.

The hub portion 18 of the armature 16 is generally planar and includes upper and lower surfaces 30 and 32, respectively (FIG. 2). A central boss 34 (FIG. 1) extends away from the lower surface 32 of the hub portion 18 for attaching the steering wheel 12 to a steering column (not shown) of a vehicle (not shown).

The hub portion 18 also includes three bosses 36 (FIG. 1) that extend away from the upper surface 30 of the hub portion 18. Each boss 36 includes an upper surface 38, as is shown in FIG. 2 with regard to one of the three bosses. A channel 40 extends from the upper surface 38 of each boss 36 to the lower surface 32 of the hub portion 18. As shown in FIG. 2, a cylindrical surface 42 of the boss 36, which is centered on an axis A, defines the channel 40.

Three spring clips 46 are attached to the lower surface 32 of the hub portion 18. A cross-section of one of the spring clips 46 is shown in FIG. 2. Each spring clip 46 includes a closed end (not shown) and two generally parallel, resilient arm portions 48. The arm portions 48 of the spring clip 46 tend to abut one another. When the arm portions 48 are separated, the resiliency of the spring clip 46 results in a force acting to return the arm portions 48 into abutting contact. Each spring clip 46 is associated with a different one of the channels 40 in the hub portion 18. The closed end of the spring clip 46 is secured to the lower surface 32 of the hub portion 18 in a location so that the arm portions 48 of the spring clip extend immediately under an opening to its associated channel 40.

The vehicle occupant protection device 14 is an air bag module that includes an inflatable air bag (not shown) and an inflator (not shown) that is actuatable for inflating the air bag for helping to protect an occupant of a vehicle. The air bag module 14 includes a chamber (not shown) in which the air bag is stored. The chamber is defined between a cover 54 (FIG. 1) of the air bag module 14 and a reaction plate 56 of the air bag module. FIG. 2 illustrates a portion of the reaction plate 56. When the inflator is actuated, the cover 54 tears in a known manner and the air bag deploys outwardly from the chamber in the air bag module 14.

The air bag module 14 illustrated in FIG. 1 has a generally elliptical shape. The air bag module 14 is sized for being received in the central cavity of the steering wheel 12. When received in the central cavity, gaps separate the sides of the air bag module 14 from the curved inner surfaces 26 of the spokes 22.

As shown in FIG. 2, the reaction plate 56 of the air bag module 14 includes upper and lower surfaces 58 and 60. Three apertures 62 extend through the reaction plate 56 between the upper and lower surfaces 58 and 60, respectively. FIG. 2 illustrates one of the three apertures 62.

A fastener 70 is associated with each aperture 62 in the reaction plate 56. FIG. 2 illustrates one of the three fasteners 70. The fastener 70 of FIG. 2 has a head portion 72 and a shank portion 74. The head portion 72 of the fastener 70 includes a rounded upper surface 76 and a flat lower surface 78. The shank portion 74 of the fastener 70 is elongated and has an outer surface 80 that defines a circular cross-sectional shape of the shank portion. An end 82 of the shank portion 74 opposite the head portion 72 is tapered. A locking notch 84 is cut into the shank portion 74 of the fastener 70 at a location adjacent the tapered end 82.

As shown in FIG. 2, the fastener 70 extends through the aperture 62 in the reaction plate 56. A metal or otherwise electrically conductive lock ring 90 is attached to the shank portion 74 of the fastener 70 below the lower surface 60 of the reaction plate 56 to secure the fastener relative to the reaction plate. Preferably, the lock ring 90 is welded to the fastener 70. The lock ring 90 also may be secured to the lower surface 60 of the reaction plate 56. When the fastener 70 is secured to the reaction plate 56, the lower surface 78 of the head portion 72 of the fastener abuts the upper surface 58 of the reaction plate and the lock ring 90 abuts the lower surface 60 of the reaction plate. As a result, the fastener 70 is fixed for movement with the air bag module 14.

The apparatus 10 also includes three bushings 94. FIG. 2 illustrates one of the three bushings 94. Each bushing 94 is associated with a different one of the channels 40 in the hub portion 18 of the steering wheel 12. The bushings 94 may be formed from any material that has a high stiffness (modulus of elasticity) and that may be formed to include a low friction surface. Examples of materials for the bushing 94 include nylon and Teflon.

The bushing 94 illustrated in FIG. 2 is tubular and includes cylindrical inner and outer surfaces 96 and 98, respectively. The cylindrical outer surface 98 of the bushing 94 has a diameter that is approximately equal to the diameter of its associated channel 40 in the hub portion 18 of the steering wheel 12 so that the bushing may be press fit into its associated channel. The cylindrical inner surface 96 of the bushing 94 forms a low friction surface of the bushing and defines a channel 100 that extends through the bushing. The cylindrical inner surface 96 of the bushing 94 has a diameter that is approximately equal to the diameter of the outer surface 80 of the shank portion 74 of the fastener 70.

The apparatus 10 also includes three coil springs 106. FIG. 2 illustrates one of the coil springs 106. Each coil spring 106 is interposed between the hub portion 18 of the steering wheel 12 and the reaction plate 56 of the air bag module 14. Each coil spring 106 has an inner diameter that is large enough to receive an associated boss 36 of the hub portion 18 of the steering wheel 12. The axial length of each coil spring 106 is greater than the distance between the upper surface 38 of the associated boss 36 and the upper surface 30 of the hub portion 18.

As is shown schematically in FIG. 2, the apparatus 10 also includes an electric device 108 of the vehicle. The electric device 108 illustrated in FIG. 2 is the vehicle horn. Other electric devices are also contemplated by the present invention. The apparatus 10 further includes a power source 110, such as the vehicle battery, for supplying electric power to the vehicle horn 108. A horn switch 112 for connecting the vehicle horn 108 to the electric power 110 is formed from the reaction plate 56 of the air bag module 14 and the hub portion 18 of the steering wheel 12, which are normally kept spaced apart by the coil springs 106.

To assemble the apparatus 10 of FIG. 1, the spring clips 46 are attached to the lower surface 32 of the hub portion 18 of the steering wheel 12 so that the arm portions 48 of each spring clip extend immediately under an opening to its associated channel 40 in the hub portion. Preferably, the spring clips 46 are electrically insulated from the hub portion 18 of the steering wheel 12.

The bushings 94 are press fit into their associated channels 40 in the hub portion 18 of the steering wheel 12. As shown in FIG. 2, each coil spring 106 is positioned about an associated boss 36 on the upper surface 30 of the hub portion 18 and a lower end of each coil spring is secured to the upper surface of the hub portion. To prevent electric current from passing through the coil springs 106, each coil spring 106 may be coated with a dielectric material or an insulating material (not shown) may be interposed between the lower end of the coil spring and the hub portion 18.

Next, the air bag module 14 is positioned relative to the steering wheel 12 so that the three fasteners 70 that are secured to the reaction plate 56 align with the channels 100 of the bushings 94 in the hub portion 18 of the steering wheel. The air bag module 14 is moved relative to the steering wheel 12 so that the tapered end 82 of each fastener 70 enters the channel 100 of its associated bushing 94. The air bag module 14 is moved toward the hub portion 18 of the steering wheel 12 so that the shank portion 74 of each fastener 70 passes through the channel 100 of its associated bushing 94 and between the arm portions 48 of the spring clip 46 located immediately under the channel. During movement of the air bag module 14 toward the hub portion 18, the upper ends of the coil springs 106 engage the lower surface 60 of the reaction plate 56. The air bag module 14 is moved toward the hub portion 18 of the steering wheel 12 and against the bias of the coil springs 106 until an arm portion 48 of each spring clip 46 snaps into the locking notch 84 of a fastener 70.

The reaction plate 56 of the air bag module 14 forms a first contact of the horn switch 112 and the hub portion 18 of the steering wheel 12 forms a second contact of the horn switch. The coils springs 106 act to bias the air bag module 14 away from the hub portion 18 of the steering wheel 12 so that the horn switch 112 is normally in an open condition.

To actuate the vehicle horn 108, a force is applied to the cover 54 of the air bag module 14 to overcome the bias of the coil springs 106 and to move the air bag module 14 toward the hub portion 18 of the steering wheel 12. During movement of the air bag module 14 toward the hub portion 18, the fasteners 70 move downwardly, as viewed with regard to one fastener in FIG. 2, relative to the hub portion 18. During the downward movement of the fasteners 70, the arm portions 48 of the spring clips 46 that are located in the locking notches 84 of the fasteners 70 bend to move with the fasteners, as is shown in FIG. 3.

Figure 3:
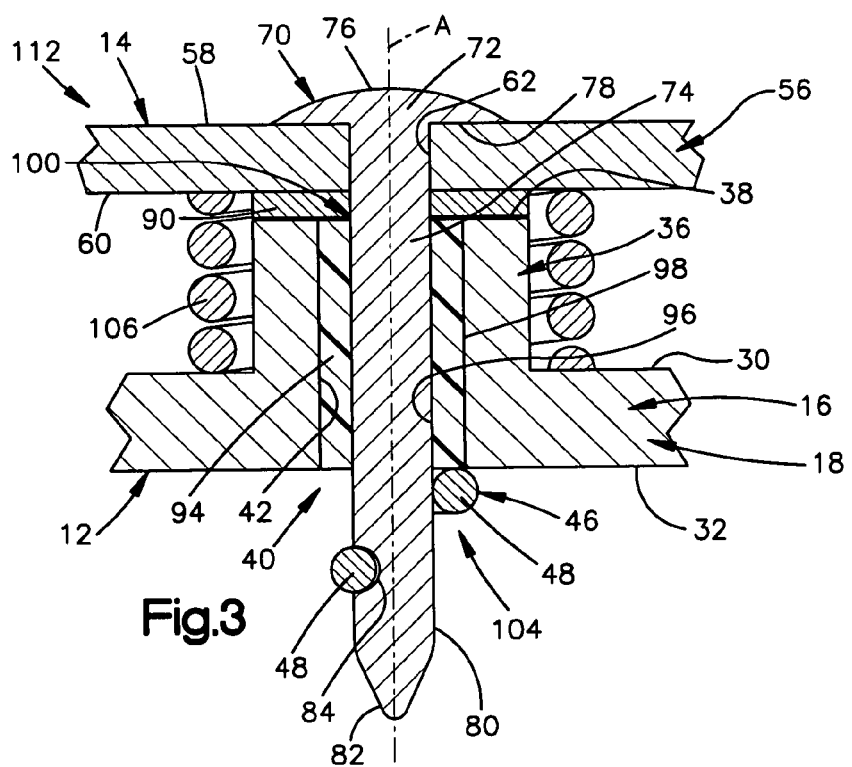
FIG. 3 illustrates the portion of FIG. 2 in a second position.

When the air bag module 14 moves into the position illustrated in FIG. 3 and the lock ring 90 contacts the upper surface 38 of the boss 36, the first and second electric contacts of the horn switch 112 are electrically connected and the horn switch is closed. As a result, electric power is supplied to the vehicle horn 108 and the vehicle horn is sounded. When the force is removed from the cover 54 of the air bag module 14, the coil springs 106 act to move the air bag module 14 upwardly, as viewed in FIG. 3, relative to the hub portion 18 of the steering wheel 12 and return the horn switch 112 to the open condition.

A mechanism, indicated generally at 104 in FIG. 2, is formed from each bushing 94 and its associated fastener 70. Since the cylindrical inner surface 96 of the bushing 94 is approximately equal to the diameter of the outer surface 80 of the shank portion 74 of the fastener 70, the outer surface 80 of the shank portion 74 of the fastener 70 engages the cylindrical inner surface 96 of the bushing 80 when extending through the channel 100 of the bushing. The material stiffness of the bushing 94 acts to resist tilting of the fastener 70 in the channel 100 of the bushing. Generally, the resistance to tilting of the fastener 70 increases as the material stiffness of the bushing 94 increases.

By resisting tilting of the fastener 70 in the channel 100 of the bushing 94, each mechanism 104 tends to block tilting of the air bag module 14 relative to the hub portion 18 of the steering wheel 12. As a result, the mechanisms 104 tend to limit movement of the air bag module 14 relative to the hub portion 18 of the steering wheel 12 to substantially only linear movement in a direction parallel to axis A. Since movement of the air bag module 14 is limited to substantially only linear movement in a direction parallel to axis A, essentially only one degree of freedom is provided between the air bag module 14 and the hub portion 18 of the steering wheel 12.

Figure 1A:
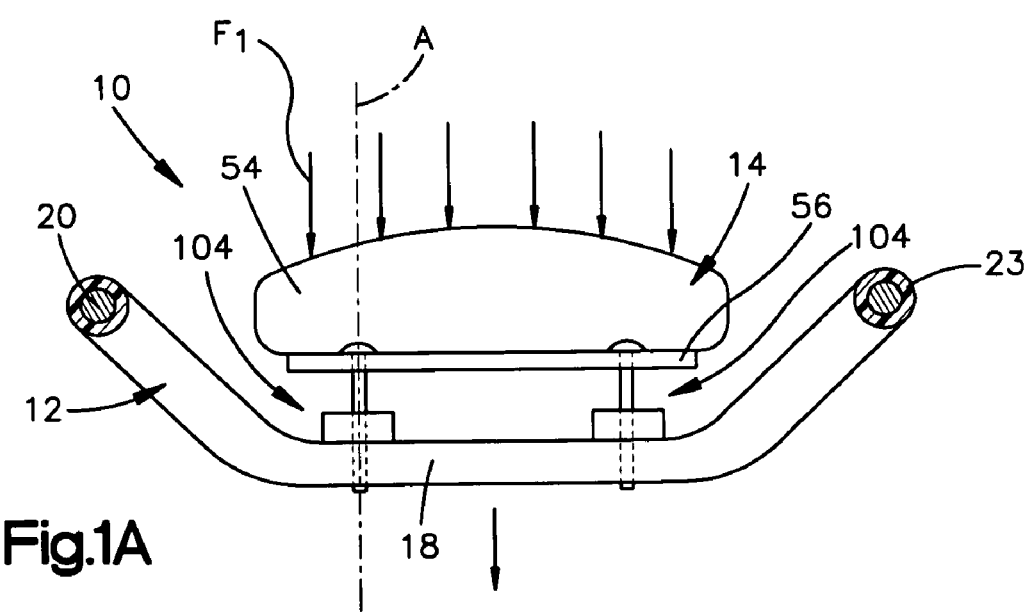
FIG. 1A is a schematic view, partially in section of the apparatus of FIG. 1.

The mechanisms 104 also enable a substantially equal downward force to be applied at any one of various locations on the air bag module 14 for actuating the vehicle horn 108. Arrows in FIG. 1A illustrate downward forces applied at various locations on the air bag module 14. Any one of the downward forces illustrated by the arrows in FIG. 1A is sufficient for actuating the vehicle horn 108. By the mechanisms 104 tending to block tilting of the air bag module 14 relative to the steering wheel 12, a downward force that is applied, for example, at an edge of the air bag module 14, such as force F1 in FIG. 1A, tends to remain directed substantially downward and less of the force is directed transverse to the downward direction. As a result, the downward force necessary to actuate the vehicle horn 108 becomes substantially equal regardless of the location on the air bag module 14 at which the downward force is applied.

Since the mechanisms 104 tend to block tilting of the air bag module 14 relative to the steering wheel 12, the size of the gaps that separate the sides of the air bag module 14 from the curved inner surfaces 26 of the spokes 22 may be reduced. Additionally, by blocking movement of the air bag module 14 in directions angled relative to axis A, the mechanisms 104 also help to damp vibrations of the air bag module 14 in directions perpendicular to axis A.

Figure 4:
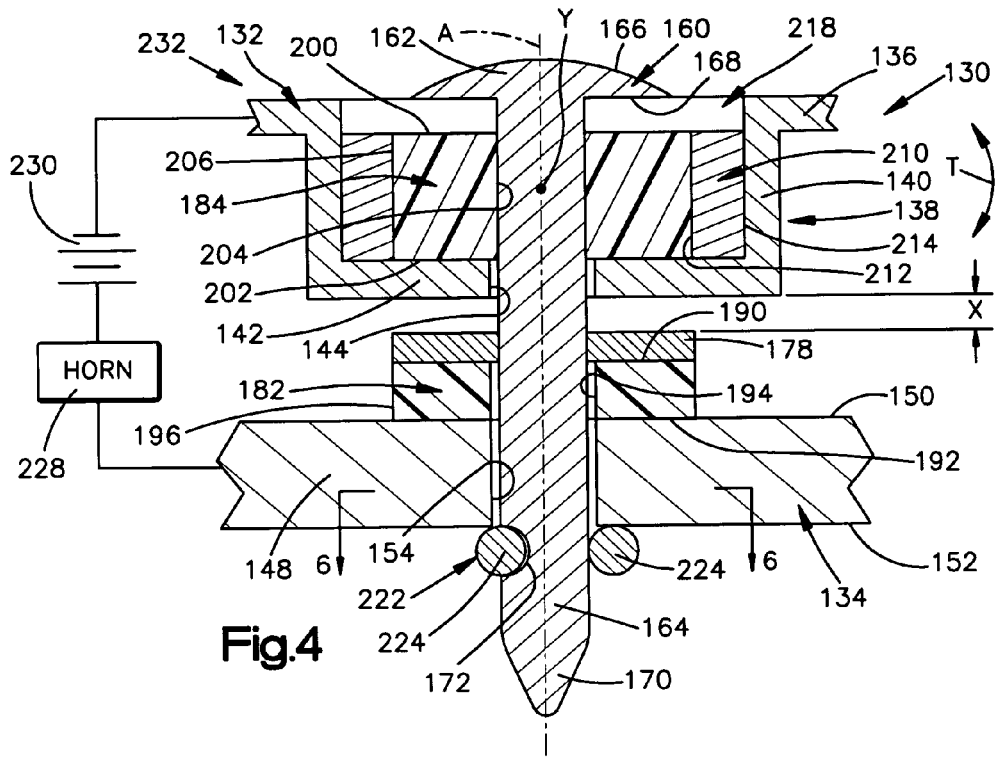
FIG. 4 is a sectional view of a portion of an apparatus constructed in accordance with a second embodiment of the present invention and illustrated in a first position.

FIG. 4 is a sectional view of a portion of an apparatus 130 constructed in accordance with a second embodiment of the present invention and illustrated in a first position. Except for the differences described below, the air bag module 132 and the steering wheel 134 of the apparatus 130 of FIG. 4 are identical as those described with reference to FIGS. 1-3.

As shown in FIG. 4, the reaction plate 136 of the air bag module 132 includes a circular recessed portion 138. The recessed portion 138 includes a cylindrical side wall 140 and a bottom wall 142. An aperture 144 extends through the center of the bottom wall 142.

Figure 6:
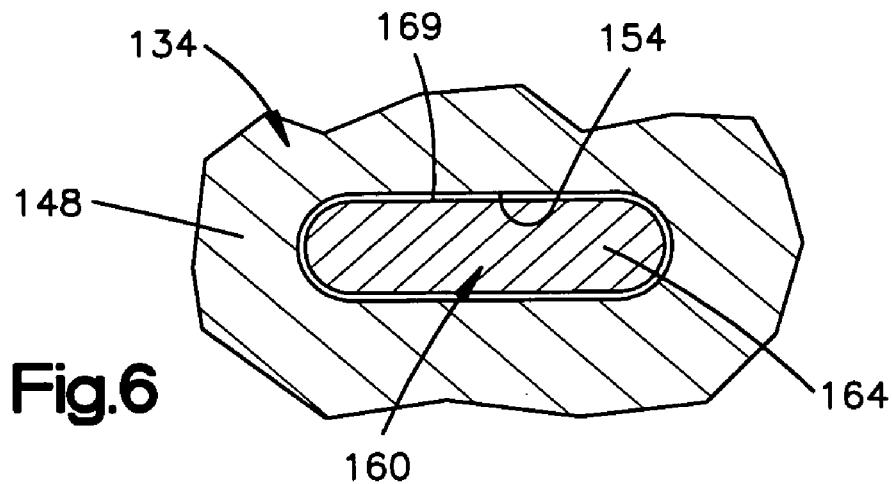
FIG. 6 is a view taken along line 6-6 in FIG. 4 and illustrates a first alternative cross-sectional shape of a fastener and corresponding aperture in a hub portion of a steering wheel.

The hub portion 148 of the steering wheel 134 is generally planar and includes upper and lower surfaces 150 and 152. An aperture 154 extends through the hub portion 148 from the upper surface 150 to the lower surface 152. As shown in FIG. 6, the aperture 154 in the hub portion 148 is generally elliptical or oval in shape.

The apparatus 130 of FIG. 4 also includes a fastener 160. The fastener 160 illustrated in FIG. 4 has a head portion 162 and a shank portion 164. The head portion 162 of the fastener 160 includes a rounded upper surface 166 and a flat lower surface 168. The shank portion 164 of the fastener 160 is elongated and has an outer surface 169 having a generally elliptical cross-sectional shape, as is shown in FIG. 6. An end 170 of the shank portion 164 of the fastener 160 opposite the head portion 162 is tapered. A locking notch 172 is cut into the shank portion 164 of the fastener 160 at a location adjacent the tapered end 170.

A lock ring 178 is associated with the shank portion 164 of the fastener 160. The lock ring 178 is generally circular. A generally elliptical opening extends through the lock ring 178 for receiving the shank portion 164 of the fastener 160. The elliptic opening has dimensions that are approximately equal to the dimensions of the outer surface 169 of the shank portion 164 of the fastener 160.

The apparatus 130 of FIG. 4 also includes first and second elastomeric rings 182 and 184, respectively. The first and second elastomeric rings 182 and 184 preferably are formed from natural rubber or some other elastomeric material. The first elastomeric ring 182 includes opposite upper and lower surfaces 190 and 192, respectively, and cylindrical inner and outer surfaces 194 and 196, respectively. The cylindrical outer surface 196 of the first elastomeric ring 182 has a diameter that is approximately equal to an outer diameter of the lock ring 178. The cylindrical inner surface 194 of the first elastomeric ring 182 has a diameter that is large enough to receive the shank portion 164 of the fastener 160.

The second elastomeric ring 184 includes opposite upper and lower surfaces 200 and 202, respectively, and inner and outer surfaces 204 and 206, respectively. The outer surface 206 of the second elastomeric ring 184 is cylindrical. The inner surface 204 of the second elastomeric ring 184 is elliptical and is bonded to the outer surface 169 of the shank portion 164 of the fastener 160 at a location spaced slightly below the lower surface 168 of the head portion 162.

An annular sleeve 210 is associated with the second elastomeric ring 184. The annular sleeve 210 preferably is formed from metal and includes cylindrical inner and outer surfaces 212 and 214, respectively. The outer surface 206 of the second elastomeric ring 184 is bonded to the cylindrical inner surface 212 of the sleeve 210. The cylindrical outer surface 214 of the sleeve 210 has a diameter that is approximately equal to the inner diameter of the side wall 140 of the recessed portion 138 of the reaction plate 136 of the air bag module 132.

A mechanism, indicated generally at 218, is formed from the fastener 160, the second elastomeric ring 184, and the sleeve 210. As will be described below, the mechanism 218 tends to block tiling of the air bag module 132 relative to the hub portion 148 of the steering wheel 134.

A spring clip 222 is associated with the fastener 160. Generally parallel arm portions 224 of the spring clip 222, which are illustrated in cross-section in FIG. 4, connect to one another at a closed end (not shown) of the spring clip. The closed end of the spring clip 222 is attached to the lower surface 152 of the hub portion 148 of the steering wheel 134. The arm portions 224 of the spring clip 222 tend to abut one another. When the arm portions 224 are separated, the resiliency of the spring clip 222 results in a force acting to return the arm portions 224 into abutting contact.

As is shown schematically in FIG. 4, the apparatus 130 also includes a vehicle horn 228 and a power source 230. As will be explained in detail below, the reaction plate 136 of the air bag module 132 and the hub portion 148 of the steering wheel 134 collectively form a horn switch 232 for, when actuated, providing electric power to the vehicle horn 228.

To assemble the apparatus 130 of FIG. 4, the mechanism 218 is assembled by bonding the second elastomeric ring 184 between the shank portion 164 of the fastener 160 and the cylindrical inner surface 212 of the sleeve 210. The shank portion 164 of the fastener 160 is then inserted through the aperture 144 in the bottom wall 142 of the recessed portion 138 of the reaction plate 136 and the sleeve 210 of the mechanism 218 is press fit against the side wall 140 of the recessed portion of the reaction plate. As a result, the sleeve 210 is fixed for movement with the reaction plate 136.

The sleeve 210 may be fixed for movement with the reaction plate 136 by a method other than by being press fit against the side wall 140. For example, the sleeve 210 may be adhered to or welded to the side wall 140 of the recessed portion 138 of the reaction plate 136. As a further example, the reaction plate 136 may be formed from plastic and the sleeve 210 may be fixed relative to the reaction plate during process of molding the reaction plate.

The tapered end 170 of the shank portion 164 of the fastener 160 is inserted into the opening in the lock ring 178. The lock ring 178 is attached to the shank portion 164 of the fastener 160 at a location spaced a predetermined distance, indicated by the distance X in FIG. 4, from the bottom wall 142 of the recessed portion 138 of the reaction plate 136. Preferably, the lock ring 178 is welded to the outer surface 169 of the shank portion 164 of the fastener 160.

The tapered end 170 of the shank portion 164 of the fastener 160 is then inserted through the first elastomeric ring 182. The first elastomeric ring 182 is moved upwardly, as viewed in FIG. 4, along the shank portion 164 of the fastener 160 until the upper surface 190 of the first elastomeric ring abuts the lock ring 178. Thereafter, the tapered end 170 of the shank portion 164 is inserted through the aperture 154 of the hub portion 148 of the steering wheel 134 in a direction from the upper surface 150 toward the lower surface 152. The fastener 160 is moved downwardly relative to the hub portion 148 until the lower surface 192 of the first elastomeric ring 182 engages the upper surface 150 of the hub portion 148 and an arm portion 224 of the spring clip 222 latches in the locking notch 172 of the fastener 160, as shown in FIG. 4.

When an arm portion 224 of the spring clip 222 latches in the locking notch 172 of the fastener 160, the fastener 160 becomes fixed relative to the hub portion 148 of the steering wheel 134. When the fastener 160 is fixed relative to the hub portion 148 of the steering wheel 134, the first elastomeric ring 182 is interposed between the hub portion 148 and the lock ring 178. The first elastomeric ring 182 acts to stabilize the fastener 160 along axis A and acts to help limit tilting of the fastener relative to axis A. The first elastomeric ring 182 resists any force that tends to tilt the fastener 160 relative to axis A.

The reaction plate 136 of the air bag module 132 forms a first contact of the horn switch 232 and the hub portion 148 of the steering wheel 134 forms a second contact of the horn switch. The second elastomeric ring 184 acts to bias the air bag module 132 away from the steering wheel 134 so that the horn switch 232 is normally in an open condition.

To actuate the vehicle horn 228, a force is applied to the cover (not shown) of the air bag module 132 to move the air bag module toward the hub portion 148 of the steering wheel 134. During movement of the air bag module 132 toward the hub portion 148, the second elastomeric ring 184 is subjected to shearing stress. Specifically, the outer surface 206 of the second elastomeric ring 184 moves downwardly, as viewed in FIG. 4, relative to the inner surface 204 of the second elastomeric ring. The inner surface 204 of the second elastomeric ring 184 remains fixed relative to the fastener 160.

Figure 5:
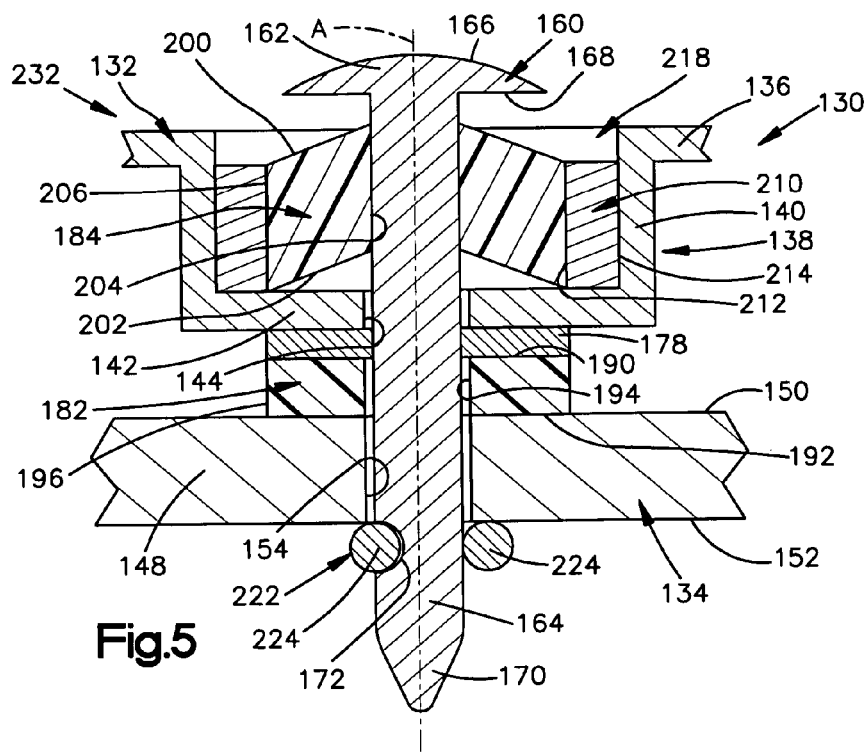
FIG. 5 illustrates the portion of FIG. 4 in a second position.

When the air bag module 132 moves into the position illustrated in FIG. 5, the bottom wall 142 of the recessed portion 138 of the reaction plate 136 contacts the lock ring 178, which is electrically connected to the hub portion 148 of the steering wheel 134 through the spring clip 222 and the fastener 160. As a result, the first and second electric contacts of the horn switch 232 are electrically connected to one another and the horn switch is closed. Electric power passes to the vehicle horn 228 and the vehicle horn is sounded. When the force is removed from the cover of the air bag module 132, the resiliency of the second elastomeric ring 184 causes the air bag module 132 to move upwardly, as viewed in FIG. 5, relative to the hub portion 148 of the steering wheel 132 and returns the horn switch 232 to the open condition.

Since the shank portion 164 of the fastener 160 of the apparatus 130 of FIG. 4 has an elliptical outer surface 169 that is received in a corresponding elliptical aperture 154 in the hub portion 148, as is shown in FIG. 6, a single fastener 160 may be used for attaching the air bag module 132 to the hub portion 148 of the steering wheel 134. The elliptical outer surface 169 of the shank portion 164 of the fastener 160 and the surface of the hub portion 148 that defines the elliptical aperture 154 cooperate to prevent rotation of the air bag module 132 relative to the steering wheel 134. When the shank portion 164 of the fastener 160 is cylindrical, as was described with reference to the fastener 70 of FIG. 2, additional structure is required to prevent rotation of the air bag module 132 about the longitudinal axis of the fastener. The additional structure for preventing the rotation in the embodiment of FIG. 1 is the second and third fasteners 70. No such additional structure is required with the use of a non-cylindrical fastener 160 and corresponding aperture 154, as is shown in FIG. 6.

Figure 7:
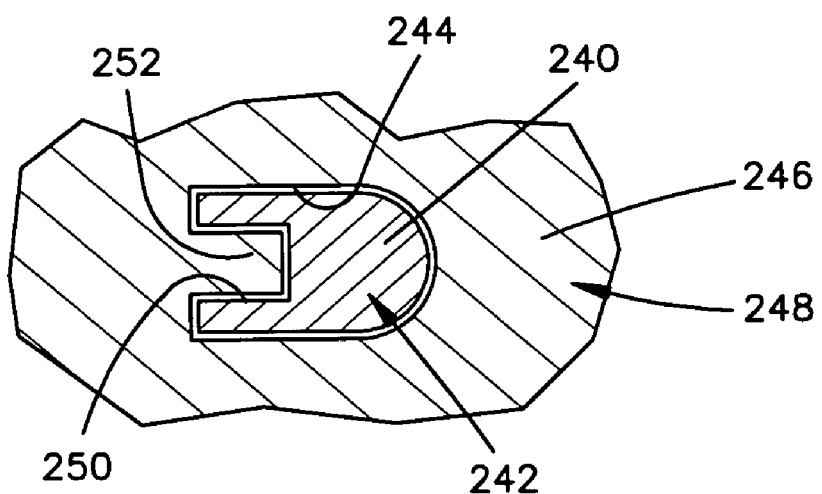
FIG. 7 illustrates a second alternative cross-sectional shape of a fastener and corresponding aperture in a hub portion of a steering wheel.

FIG. 7 illustrates a second alternative cross-sectional shape of a shank portion 240 of a fastener 242 and corresponding aperture 244 in a hub portion 246 of a steering wheel 248. The shank portion 240 of the fastener 242 in FIG. 7 includes a keyed portion 250. The corresponding aperture 244 of the hub portion 246 is shaped so that the hub portion also includes a keyed portion 252. The keyed portion 252 of the hub portion 246 interacts with the keyed portion 250 of the shank portion 240 of the fastener 242 to prevent rotation of the air bag module relative to the steering wheel 248. As a result, a single fastener 242 may be used for attaching the air bag module to the hub portion 246 of the steering wheel 248.

The mechanism 218 tends to block tilting of the air bag module 132 relative to the hub portion 148 during the downward movement of the air bag module 132 relative to the hub portion 148 of the steering wheel 134 for actuating the vehicle horn 228. More particularly, the second elastomeric ring 184 tends to block tilting of the sleeve 210 relative to axis A.

The second elastomeric ring 184 has material properties for helping to block tilting of the sleeve 210 relative to axis A. Specifically, the second elastomeric ring 184 has a high articulation stiffness. As shown in FIG. 4, the articulation stiffness of the second elastomeric ring 184 tends to resist movement of the sleeve 210 about point Y, which is located at the center of the fastener 160, in the directions illustrated by arrows T. Preferably, the second elastomeric ring 184 also includes a substantially high radial stiffness and a low axial stiffness. The radial stiffness of the second elastomeric ring 184 is the second elastomeric ring's stiffness against movement in a horizontal direction, as viewed in FIG. 4. The axial stiffness of the second elastomeric ring 184 is the second elastomeric ring's stiffness against movement in a vertical direction, as viewed in FIG. 4. The low axial stiffness of the second elastomeric ring 184 enables the air bag module 132 to be moved downwardly, as viewed in FIG. 4, relative to the hub portion 148 of the steering wheel 134 for actuating the vehicle horn 228.

Since the second elastomeric ring 184 tends to block tilting of the sleeve 210 relative to the fastener 160, the mechanism 218 effectively provides only one degree of freedom between the air bag module 132 and the steering wheel 134. The one degree of freedom is parallel to axis A. As a result, when a force is applied to the air bag module 132 for actuating the vehicle horn 228, a central axis of the sleeve 210 tends to remain collinear with axis A during movement of the air bag module 132 relative to the steering wheel 134.

The mechanism 218 enables a substantially equal downward force to be applied at any one of various locations on the air bag module 132 for actuating the vehicle horn 228. The substantially equal downward force at any one of various locations on the air bag module 132 results from the high articulation stiffness of the second elastomeric ring 184 resisting the tilting of the air bag module. By blocking tilting of the air bag module 132, the air bag module 132 moves substantially only in a direction parallel to axis A in response to the force.

In one embodiment of the invention, it was decided to limit tilting of the air bag module 132 relative to axis A to less than 0.44 degrees and to enable actuation of the vehicle horn 228 with a force of approximately 30 Newtons. To meet these desired goals, calculated material properties of the second elastomeric ring 184 were determined to be as follows:

Articulation stiffness=700 N mm/deg.
Axial stiffness=0.1 N/mm
Radial stiffness=500 N/mm.

It was also determined that a preload force of 6 Newtons should be applied to the second elastomeric ring 184 when interposed between the fastener 160 and the sleeve 210 of the mechanism 218. The preload force is sufficient to resist a downward movement of the air bag module 132, when assembled into a vehicle, due to the effects of gravity.

In addition to enabling a substantially equal downward force to be applied at any one of various locations on the air bag module 132 for actuating the vehicle horn 228, the tendency of the mechanism 218 to block substantially tilting of the air bag module 132 relative to the steering wheel 134 provides other benefits. For example, the size of the gaps that separate the air bag module 132 and the steering wheel 134 may be reduced. Also, vibrations of the air bag module 132 in a direction generally perpendicular to axis A are damped.

Figure 8:
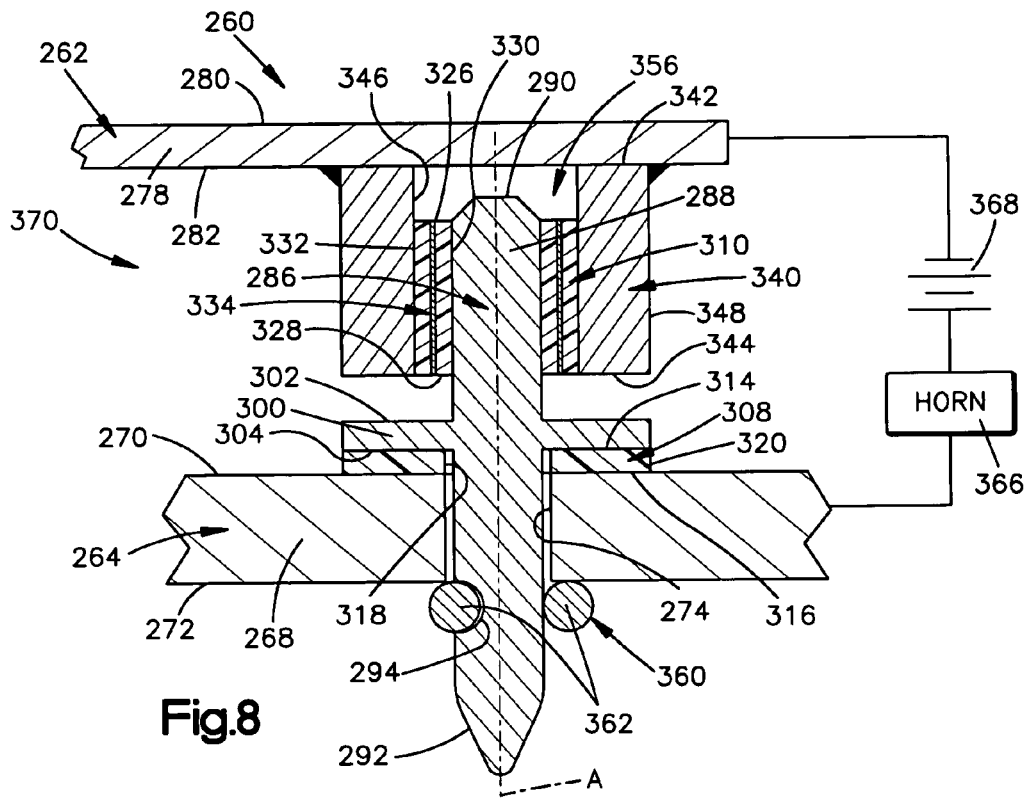
FIG. 8 is a sectional view of a portion of an apparatus constructed in accordance with a third embodiment of the present invention and illustrated in a first position.

FIG. 8 illustrates a portion of an apparatus 260 constructed in accordance with a third embodiment of the present invention. Except for the differences described below, the air bag module 262 and the steering wheel 264 of the apparatus of FIG. 8 are identical as those described with reference to FIGS. 1-3.

The hub portion 268 of the steering wheel 264 is generally planar and includes upper and lower surfaces 270 and 272, respectively. An aperture 274 extends through the hub portion 268 from the upper surface 270 to the lower surface 272. The reaction plate 278 of the air bag module 262 is also generally planar. The reaction plate 278 includes opposite upper and lower surfaces 280 and 282, respectively.

The apparatus 260 of FIG. 8 includes a fastener 286 having a generally cylindrical shank portion 288 that is centered on axis A. The shank portion 288 includes opposite first and second ends 290 and 292, respectively. The second end 292 of the fastener 286 is tapered. A locking notch 294 is cut into the shank portion 288 of the fastener 286 at a location adjacent the second end 292.

The fastener 286 also includes a flange portion 300 that extends outwardly of the shank portion 288 at a location approximately midway between the first and second ends 290 and 292. The flange portion 300 includes annular upper and lower surfaces 302 and 304, respectively, that extend in a direction perpendicular to axis A.

The apparatus 260 also includes first and second elastomeric rings 308 and 310, respectively. The first and second elastomeric rings 308 and 310 preferably are formed from natural rubber or some other elastomeric material. The first elastomeric ring 308 includes annular upper and lower surfaces 314 and 316, respectively, and cylindrical inner and outer surfaces 318 and 320, respectively. The cylindrical outer surface 320 of the first elastomeric ring 308 has a diameter that is approximately equal to the outer diameter of the flange portion 300 of the fastener 286. The cylindrical inner surface 318 of the first elastomeric ring 308 has a diameter that is large enough to receive the shank portion 288 of the fastener 286.

The second elastomeric ring 310 includes opposite upper and lower surfaces 326 and 328, respectively, and cylindrical inner and outer surfaces 330 and 332, respectively. The inner surface 330 of the second elastomeric ring 310 is bonded to an outer surface of the shank portion 288 of the fastener 286 at a location adjacent the first end 290 of the fastener.

The second elastomeric ring 310 may also include one or more metallic sleeves. The second elastomeric ring 310 of FIGS. 8 and 9 includes one metallic sleeve 334. Metallic sleeve 334 is tubular and is coaxial with the cylindrical inner and outer surfaces 330 and 332 of the second elastomeric ring 310. The metallic sleeve 334 substantially increases the articulation stiffness of the second elastomeric ring 310 while only increasing the axial stiffness of the second elastomeric ring by a small amount.

A tubular sleeve 340 is associated with the second elastomeric ring 310. The sleeve 340 has a length, measured along axis A, that is greater than the corresponding length of the second elastomeric ring 310. The sleeve 340 preferably is formed from metal and includes opposite first and second annular ends 342 and 344, respectively, and cylindrical inner and outer surfaces 346 and 348, respectively. The outer surface 332 of the second elastomeric ring 310 is bonded to the cylindrical inner surface 346 of the sleeve 340. The lower surface 328 of the second elastomeric ring 310 is disposed adjacent the second annular end 344 of the sleeve.

A mechanism, indicated generally at 356, is formed from the fastener 286, the second elastomeric ring 310, and the sleeve 340. As will be described below, the mechanism 356 tends to block tilting of the air bag module 262 relative to the hub portion 268 of the steering wheel 264.

A spring clip 360 is associated with the fastener 286. Generally parallel arm portions 362 of the spring clip 360, which are illustrated in cross-section in FIG. 8, connect to one another at a closed end (not shown) of the spring clip. The closed end of the spring clip 360 is attached to the lower surface 272 of the hub portion 268. The arm portions 362 of the spring clip 360 tend to abut one another. When the arm portions 362 are separated, the resiliency of the spring clip 360 results in a force acting to return the arm portions 362 into abutting contact.

As is shown schematically in FIG. 8, the apparatus 260 also includes a vehicle horn 366 and a power source 368. As will be explained in detail below, the reaction plate 278 of the air bag module 262 and the hub portion 268 of the steering wheel 264 collectively form a horn switch 370.

To assemble the apparatus 260 of FIG. 8, the mechanism 356 is assembled by bonding the second elastomeric ring 310 between the shank portion 288 of the fastener 286 and the cylindrical inner surface 346 of the sleeve 340 at a location adjacent the second annular end 344 of the sleeve. The first annular end 342 of the sleeve 340 is then fixed to the lower surface 282 of the reaction plate 278. FIG. 8 illustrates the sleeve 340 welded to the lower surface 282 of the reaction plate 278. As a result, the sleeve 340 is fixed for movement with the reaction plate 278.

The second end 292 of the shank portion 288 of the fastener 286 is then inserted through the first elastomeric ring 308. The first elastomeric ring 308 is moved upwardly, as viewed in FIG. 8, along the shank portion 288 of the fastener 286 until the upper surface 314 of the first elastomeric ring abuts the lower surface 304 of the flange portion 300 of the fastener.

The second end 292 of the shank portion 288 of the fastener 286 is then inserted through the aperture 274 of the hub portion 268 of the steering wheel 264 in a direction from the upper surface 270 toward the lower surface 272. The fastener 286 is moved downwardly relative to the hub portion 268 until the lower surface 316 of the first elastomeric ring 308 engages the upper surface 270 of the hub portion and an arm portion 362 of the spring clip 360 latches in the locking notch 294 of the fastener 286, as shown in FIG. 8.

When an arm portion 362 of the spring clip 360 is latched in the locking notch 294 of the fastener 286, the fastener becomes fixed relative to the hub portion 268 of the steering wheel 264. When the fastener 286 is fixed relative to the hub portion 268 of the steering wheel 264, the first elastomeric ring 308 is interposed between the hub portion 268 and the flange portion 300. The first elastomeric ring 308 acts to help stabilize the fastener 286 along axis A and acts to help prevent tilting of the fastener relative to axis A.

The reaction plate 278 of the air bag module 262 forms a first contact of the horn switch 370 and the hub portion 268 of the steering wheel 264 forms a second contact of the horn switch. The second elastomeric ring 310 normally supports the air bag module 262 in a position away from the hub portion 268 so that the horn switch 370 is normally in an open condition.

To actuate the vehicle horn 366, a force is applied to the cover of the air bag module 262 to move the air bag module toward the hub portion 268 of the steering wheel 264. During movement of the air bag module 262 toward the hub portion 268, the second elastomeric ring 310 is subjected to shearing stress. Specifically, the outer surface 332 of the second elastomeric ring 310 moves downwardly, as viewed in FIG. 8, relative to the inner surface 330 of the second elastomeric ring.

Figure 9:
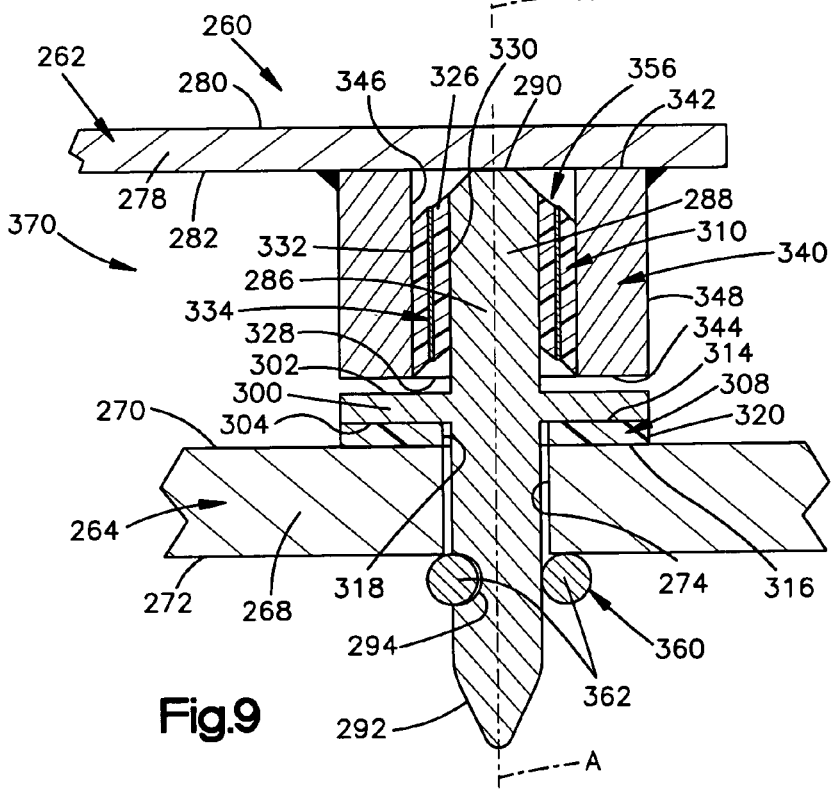
FIG. 9 illustrates the portion of FIG. 8 in a second position.

When the air bag module 262 moves into the position illustrated in FIG. 9, the lower surface 282 of the reaction plate 278 contacts the first end 290 of the fastener 286, which is electrically connected to the hub portion 268 of the steering wheel 264 through the spring clip 360. As a result, the first and second electric contacts, i.e., the reaction plate 278 and the hub portion 268, respectively, of the horn switch 370 are electrically connected to one another and the horn switch is closed. Electric power passes to the vehicle horn 366 and the vehicle horn is sounded. When the force is removed from the cover of the air bag module 262, the second elastomeric ring 310 causes the air bag module 262 to move upwardly, as viewed in FIG. 9, relative to the hub portion 268 of the steering wheel 264 and returns the horn switch 370 to the open condition.

When the fastener 286 has a cylindrical shank portion 288, at least one additional fastener or other structure is necessary to prevent rotation of the air bag module 262 about axis A relative to the hub portion 268 of the steering wheel 264. As an alternative, the shank portion 288 of the fastener 286 and the corresponding aperture 274 in the hub portion 268 of the steering wheel 264 may be shaped to prevent such relative rotation. For example, the shank portion 288 of the fastener 286 and the corresponding aperture 274 in the hub portion 268 may be shaped as illustrated in FIG. 6 or 7.

During the downward movement of the air bag module 262 relative to the hub portion 268, the mechanism 356 tends to limit movement of the air bag module 262 relative to the hub portion 268 of the steering wheel 264 to substantially linear movement in a direction parallel to axis A, regardless of the location on the cover of the air bag module at which the force is applied. The second elastomeric ring 310 has material properties similar to those described above with reference to the second elastomeric ring 184 of FIGS. 4 and 5. Specifically, the second elastomeric ring 310 has a substantially high articulation stiffness, a substantially high radial stiffness, and a low axial stiffness. The substantially high articulation stiffness of the second elastomeric ring 310 acts to block substantially tilting of the air bag module 262 relative to the hub portion 268.

Since the second elastomeric ring 310 tends to block tilting of the sleeve 340 relative to axis A, a central axis of the sleeve 340 tends to remain collinear with axis A during movement of the air bag module 262 relative to the steering wheel 264. Thus, the mechanism 356 effectively provides only one degree of freedom between the air bag module 262 and the steering wheel 264. The one degree of freedom is parallel to axis A.

The mechanism 356 enables a substantially equal downward force to be applied at any one of various locations on the air bag module 262 for actuating the vehicle horn 366. The mechanism 356 further enables a reduction in the size of the gaps that separate the air bag module 262 and the steering wheel 264 and helps to damp vibrations of the air bag module in directions perpendicular to axis A.

Figure 10:
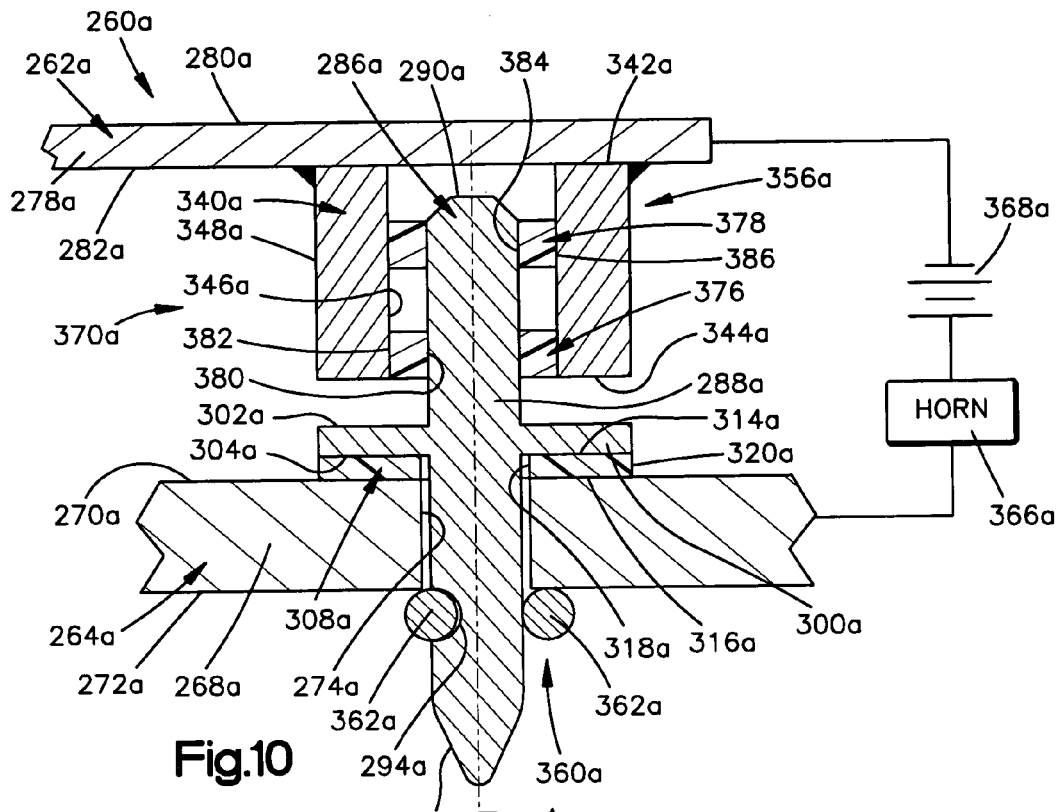
FIG. 10 is a sectional view of a portion of an apparatus constructed in accordance with a fourth embodiment of the present invention and illustrated in a first position.

FIG. 10 illustrates a portion of an apparatus 260a constructed in accordance with a fourth embodiment of the present invention. The apparatus 260a of FIG. 10 is similar to the apparatus 260 of FIG. 8 and operates in a manner similar to the apparatus of FIG. 8. Structures of the apparatus 260a of FIG. 10 that are the same as or similar to those of the apparatus 260 of FIG. 8 are labeled using the same reference numbers with the addition of the suffix "a".

The apparatus 260a of FIG. 10 is identical to the apparatus 260 of FIG. 8 with the exception that the mechanism 356a is formed from axially spaced first and second elastomeric rings 376 and 378, respectively, instead of a single elastomeric ring 310, as in the apparatus 260 of FIG. 8. The first elastomeric ring 376 includes cylindrical inner and outer surfaces 380 and 382, respectively. The inner surface 380 is bonded to the outer surface of the shank portion 288a of the fastener 286a, and the outer surface 382 is bonded to the cylindrical inner surface 346a of the sleeve 340a at a location adjacent the second annular end 344a.

The second elastomeric ring 378 also includes cylindrical inner and outer surfaces 384 and 386, respectively. The inner surface 384 is bonded to the outer surface of the shank portion 288a of the fastener 286a at a location spaced axially above the first elastomeric ring 376, as viewed in FIG. 10. The outer surface 386 of the second elastomeric ring 378 is bonded to the cylindrical inner surface 346a of the sleeve 340a at a location spaced axially above the first elastomeric ring 376, as viewed in FIG. 10.

As with the embodiment of FIG. 8, the mechanism 356a of FIG. 10 tends to limit movement of the air bag module 262a relative to the hub portion 268a of the steering wheel 264a to substantially linear movement parallel to axis A and tends to prevent movement of the air bag module in all directions angled relative to axis A. The first and second elastomeric rings 376 and 378 of the mechanism 356a have material properties similar to those described above with reference to the second elastomeric ring 184 of FIGS. 4 and 5. Specifically, the first and second elastomeric rings 376 and 378 each have a substantially high articulation stiffness, a substantially high radial stiffness, and a low axial stiffness.

When a force is applied to the cover of the air bag module 262a to move the air bag module toward the hub portion 268a of the steering wheel 264a, the first and second elastomeric rings 376 and 378 are subjected to shearing stress. Specifically, the outer surfaces 382 and 386 of the first and second elastomeric rings 376 and 378, respectively, move downwardly, as viewed in FIG. 10, with the sleeve 340a and relative to the inner surfaces 380 and 384 of the first and second elastomeric rings.

During the downward movement of the air bag module 262a relative to the hub portion 268a, the first and second elastomeric rings 376 and 378, due to their substantially high articulation stiffnesses, tend to block tilting of the sleeve 340a relative to axis A. As a result, the mechanism 356a tends to limit movement of the air bag module 262a relative to the hub portion 268a of the steering wheel 264a to substantially linear movement in a direction parallel to axis A, regardless of the location of the applied force.

Figure 11:
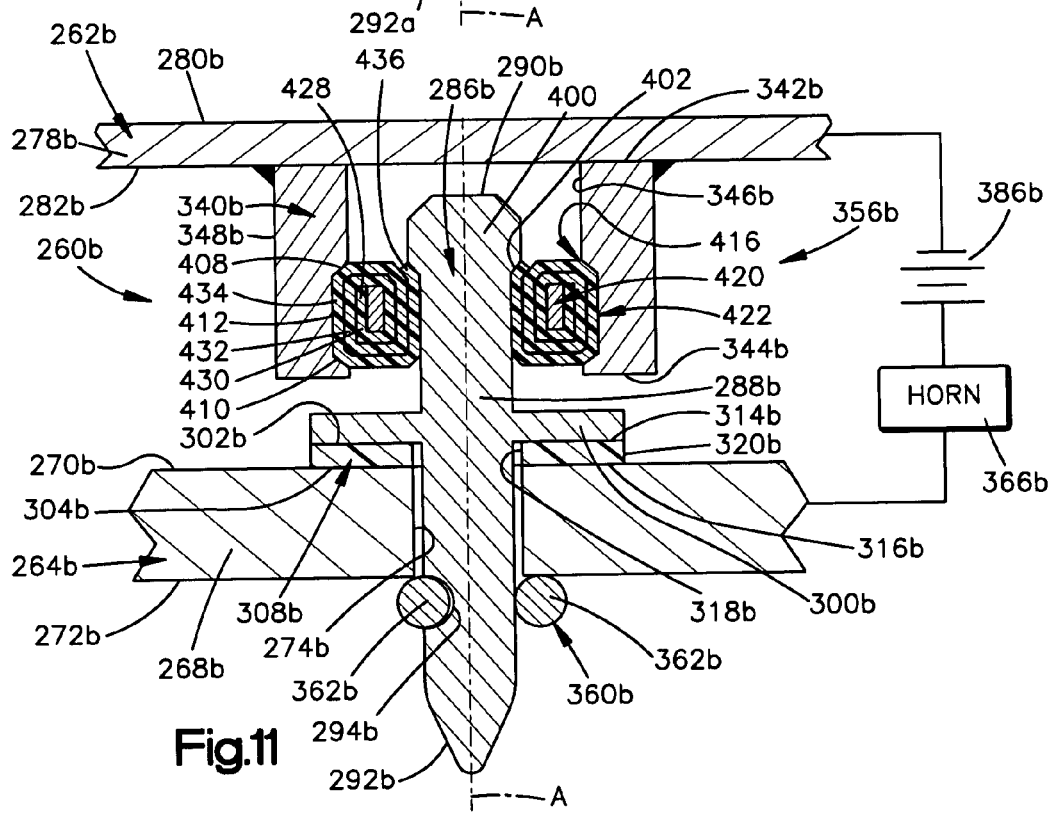
FIG. 11 is a view, partially in section, of a portion of an apparatus constructed in accordance with a fifth embodiment of the present invention and illustrated in a first position.

FIG. 11 illustrates a portion of an apparatus 260b constructed in accordance with a fifth embodiment of the present invention. The apparatus 260b of FIG. 11 is similar to the apparatus 260 of FIG. 8. Only the differences between the apparatus 260 of FIG. 8 and the apparatus 260b of FIG. 11 are discussed below. Structures of the apparatus 260b of FIG. 11 that are the same as or similar to those of the apparatus 260 of FIG. 8 are labeled using the same reference numbers with the addition of the suffix "b".

In the apparatus 260b of FIG. 11, the first end 290b of the fastener 286b includes a head portion 400. The head portion 400 has a width, measured perpendicular to axis A, which is greater than the corresponding width of the shank portion 288b of the fastener 286b. An angled lower surface 402 of the head portion 400 of the fastener 286b forms a transition between the head portion 400 and the shank portion 288b.

The inner surface 346b of the sleeve 340b includes upper and lower tapered surfaces 408 and 410, respectively, and an intervening annular surface 412. The upper and lower tapered surfaces 408 and 410 and the annular surface 412 collectively define a circumferential groove 416 that is located adjacent the second end 344b of the sleeve 340b.

The apparatus 260b of FIG. 11 also includes an annular insert 420 and a roll bushing 422. The roll bushing 422 is formed from a sheet of elastomeric material that is rolled around the annular insert 420 a plurality of times. The elastomeric material is natural rubber or some other elastomeric material.

To form the roll bushing 422, an inner end 428 of the elastomeric sheet is positioned radially outwardly of the annular insert 420. The elastomeric sheet is extended through the center of the annular insert 420 and is overlapped upon itself so as to form an inner layer 430, an intermediate layer 432, and an outer layer 434. An outer end 436 of the elastomeric sheet is located radially inwardly of the annular insert 420 after the roll bushing 422 is formed.

The fastener 286b is inserted through the center of the roll bushing 422 so that the outer end 436 is positioned adjacent the angled lower surface 402 of the head portion 400 of the fastener. The portion of the roll bushing 422 that contacts the shank portion 288b of the fastener 286b is bonded to the shank portion.

The inner layer 430, the intermediate layer 432, and the outer layer 434 of the roll bushing 422 are bonded together at locations radially outward of the annular insert 420, relative to axis A. The roll bushing 422 is then positioned in the circumferential groove 416 of the sleeve 340b and the outer layer 434 of the roll bushing 422 is bonded to the upper and lower tapered surfaces 408 and 410 and the annular surface 412 that collectively form the circumferential groove 416.

A mechanism 356b is formed from the fastener 286b, the sleeve 340b, the annular insert 420, and the roll bushing 422. As with the embodiment of FIG. 8, the mechanism 356b of FIG. 11 tends to limit movement of the air bag module 262b relative to the hub portion 268b of the steering wheel 264b to substantially linear movement parallel to axis A and tends to prevent movement of the air bag module in all directions angled relative to axis A. Specifically, the roll bushing has a substantially high articulation stiffness, a substantially high radial stiffness, and a low axial stiffness. The substantially high articulation stiffness of the roll bushing 422 acts to block substantially tilting of the air bag module 262b relative to the hub portion 268b.

When a force is applied to the cover of the air bag module 262b to move the air bag module toward the hub portion 268b of the steering wheel 264b, the sleeve 340b tends to force the roll bushing 422 downward, as viewed in FIG. 11. The portion of the roll bushing 422 that is bonded to the shank portion 288b of the fastener 286b is fixed relative to the fastener and does not move with the sleeve 340b. During downward movement of the sleeve 340b, the portion of the roll bushing 422 that is bonded to the shank portion 288b of the fastener 286b is subjected primarily to tensile stress. Specifically, the portion of the roll bushing 422 bonded to the sleeve 340b moves downwardly, as viewed in FIG. 11, with the sleeve and relative to the portion of the roll bushing that is bonded to the fastener 286b.

During the downward movement of the air bag module 262b relative to the hub portion 268b, the mechanism 356b tends to block tilting of the air bag module 262b relative to the hub portion 268b of the steering wheel 264b. More particularly, the roll bushing 422, due to its substantially high articulation stiffness, tends to block tilting of the sleeve 340b relative to axis A. As a result, the mechanism 356b tends to limit movement of the air bag module 262b relative to the hub portion 268b of the steering wheel 264b to substantially linear movement parallel to axis A.

By limiting movement of the air bag module 262 to substantially linear movement parallel to axis A, the mechanism 356b enables a substantially equal downward force to be applied at any one of various locations on the air bag module 262b for actuating the vehicle horn 366b. The mechanism 356b also enables a reduction in the size of the gaps that separate the air bag module 262b and the steering wheel 264b and helps to damp vibrations of the air bag module in directions perpendicular to axis A.

FIG. 12 is a view, partially in section, of a portion of an apparatus 500 constructed in accordance with a sixth embodiment of the present invention and illustrated in a first position. The apparatus 500 includes a steering wheel 502. FIG. 12 illustrates a hub portion 504 of an armature 506 of the steering wheel 502. FIG. 12 also illustrates foam portions 508 and 510 of first and second spokes 512 and 514, respectively, of the steering wheel 502.

The apparatus 500 also includes an air bag module 520. The air bag module 520 includes a reaction plate 522 having a recessed central portion 524 that is surrounded by an annular outer portion 526. A cover 528 for the air bag module 520 is attached to the reaction plate 522.

The apparatus 500 of FIG. 12 includes two mechanisms 532 to help limit movement of the air bag module 520 relative to the hub portion 504 of the steering wheel 502 to linear movement parallel to axis A and to help block tilting of the air bag module relative to the steering wheel 502. Each of the two mechanisms 532 includes a cylindrical stud 534 that extends from the annular outer portion 526 of the reaction plate 522 in a direction away from the cover 528. FIG. 12 illustrates two studs 534 that are located at diametrically opposite sides of the recessed central portion 524 of the reaction plate 522.

Each mechanism 532 also includes an elastomeric ring 536 and a sleeve 538. The elastomeric ring 536 includes cylindrical inner and outer surfaces 544 and 546, respectively. The sleeve 538 is tubular and includes opposite first and second ends 548 and 550, respectively, and cylindrical inner and outer surfaces 552 and 554, respectively. The inner surface 544 of the elastomeric ring 536 is bonded to the stud 534 of the mechanism 532 at a location adjacent an end of the stud opposite the air bag module 520. The outer surface 546 of the elastomeric ring 536 is bonded to the inner surface 552 of the sleeve 538 at a location adjacent the first end 548 of the sleeve. The second end 550 of the sleeve 538 of the mechanism 532 is fixed to an upper surface 556 of the hub portion 504 of the steering wheel 502.

The elastomeric ring 536 of each mechanism 532 has material properties similar to those described above with reference to the second elastomeric ring 184 of FIGS. 4 and 5. Specifically, the elastomeric ring 536 has a substantially high articulation stiffness, a substantially high radial stiffness, and a low axial stiffness. The substantially high articulation stiffness of the elastomeric ring 536 tends to block tilting of the air bag module 520 relative to the hub portion 504.

Vehicle electronics 558 are located on the upper surface 556 of the hub portion 504 of the steering wheel 502 in a location immediately below the recessed central portion 524 of the reaction plate 522 of the air bag module 520. The vehicle electronics 558 include circuitry for an electric device of the vehicle, such as a vehicle horn.

A first contact of an electric switch 562 is connected to the vehicle electronics 558 and a second contact of the electric switch is connected to the reaction plate 522 of the air bag module 520. The electric switch 562 is normally in an open condition, as viewed in FIG. 12. The electric switch 562 is closed in response to the recessed central portion 524 of the reaction plate 522 of the air bag module 520 contacting the vehicle electronics 558.

When a force is applied to the cover 528 of the air bag module 520 to move the air bag module toward the hub portion 504 of the steering wheel 502, the elastomeric rings 536 of the mechanisms 532 are subjected to shearing stress. Specifically, the inner surface 544 of each elastomeric ring 536 moves downwardly, as viewed in FIG. 12, with the stud 534 and relative to the outer surface 546 of the elastomeric ring.

During the downward movement of the air bag module 520 relative to the hub portion 504, the mechanisms 532 tends to limit movement of the air bag module 520 relative to the hub portion 504 of the steering wheel 502 to linear movement in a direction parallel to axis A, regardless of the location of the applied force. More particularly, the elastomeric rings 536 tend to prevent tilting of the stud 534 relative to the sleeve 538 during movement of the air bag module 520. As a result, the air bag module 520 tends to move in a direction parallel to axis A.

FIG. 13 is a view, partially in section, of a portion of an apparatus 600 constructed in accordance with a seventh embodiment of the present invention and illustrated in a first position. The apparatus 600 includes a steering wheel 602. FIG. 13 illustrates a hub portion 604 of an armature 606 of the steering wheel 602. FIG. 13 also illustrates foam portions 608 and 610 of first and second spokes 612 and 614, respectively, of the steering wheel 602.

The apparatus 600 also includes an air bag module 620. The air bag module 620 includes a reaction plate 622 having a recessed central portion 624 that is surrounded by an annular outer portion 626. A cover 628 for the air bag module 620 is attached to the reaction plate 622.

The apparatus 600 of FIG. 13 also includes two mechanisms 632 for helping to limit movement of the air bag module 620 relative to the hub portion 604 of the steering wheel 602 to linear movement parallel to axis A and for helping to prevent movement of the air bag module in all directions angled relative to axis A. Each of the mechanisms 632 includes a cylindrical stud 634 that extends from the annular outer portion 626 of the reaction plate 622 in a direction away from the cover 628. FIG. 13 illustrates two studs 634 that are located at diametrically opposite sides of the recessed central portion 624 of the reaction plate 622. Each of the studs 634 has a cylindrical outer surface 636.

Each mechanism 632 also includes a plastic bushing 640. The bushing 640 includes cylindrical inner surface 642 having a diameter that is substantially equal to the diameter of the cylindrical outer surface 636 of the stud 634 of the mechanism 632. Each plastic bushing 640 is fixed to an upper surface 646 of the hub portion 604 of the steering wheel 602 in location for receiving a stud 634 of the mechanism 632.

The apparatus 600 also includes two biasing elements 652. The biasing elements 652 illustrated in FIG. 13 are coil springs. Each of the coil springs 652 illustrated in FIG. 13 is sized to fit within an associated bushing 640.

The air bag module 620 is mounted to the hub portion 604 of the steering wheel 602 in a known manner in which the air bag module may be moved relative to the hub portion. When the air bag module 620 is mounted to the hub portion 604, each plastic bushing 640 receives a stud 634, as is shown in FIG. 13. A coil spring 652 is located in each bushing 640 between the upper surface 646 of the hub portion 604 and an end of the stud 634. As an alternative, the coil springs 652 may be located outside of and encircling the bushings 640.

Vehicle electronics 656 are located on the upper surface 646 of the hub portion 604 of the steering wheel 602 in a location immediately below the recessed central portion 624 of the reaction plate 622 of the air bag module 620. The vehicle electronics 656 include circuitry for an electric device of the vehicle, such as a vehicle horn.

A first contact of an electric switch 660 is connected to the vehicle electronics 656 and a second contact of the electric switch is connected to the reaction plate 622 of the air bag module 620. The electric switch 660 is normally in an open condition, as viewed in FIG. 13. The electric switch 660 is closed in response to the recessed central portion 624 of the reaction plate 622 of the air bag module 620 contacting the vehicle electronics 656.

When a force is applied to the cover 628 of the air bag module 620 to move the air bag module toward the hub portion 604 of the steering wheel 602, the studs 634 of the mechanisms 632 move downwardly, as viewed in FIG. 13, relative to the bushings 640 and against the bias of the coil springs 652. During the downward movement of the air bag module 620 relative to the hub portion 604, the inner surfaces 642 of the bushings 640 interact with the outer surfaces 636 of the studs 634 to limit movement of the air bag module 620 relative to the hub portion 604 of the steering wheel 602. The movement is limited to substantially linear movement in a direction parallel to axis A, regardless of the location of the applied force. The interaction of the inner surfaces 642 of the bushings 640 and the outer surfaces 636 of the studs 634 tends to block tilting of the air bag module 620 relative the steering wheel 602. As a result, gaps 662 located between the cover 628 of the air bag module 620 and the foam portions 608 and 610 of the first and second spokes 612 and 614 may be reduced.

FIG. 14 is a view, partially in section, of a portion of an apparatus 700 constructed in accordance with an eighth embodiment of the present invention and illustrated in a first position. The apparatus 700 includes a steering wheel 702. FIG. 14 illustrates a hub portion 704 of an armature 706 of the steering wheel 702. FIG. 14 also illustrates foam portions 708 and 710 of first and second spokes 712 and 714, respectively, of the steering wheel 702.

The apparatus 700 also includes an air bag module 720. The air bag module 720 includes a reaction plate 722 having a recessed central portion 724 that is surrounded by an annular outer portion 726. A cover 728 for the air bag module 720 is attached to the reaction plate 722.

The apparatus 700 also includes two mechanisms 732 for mounting the air bag module 720 to the steering wheel 702 in a manner that enables the air bag module to move relative to the hub portion 704 of the steering wheel. More than two mechanisms 732 may be provided for mounting the air bag module 720 to the steering wheel 702. Each of the mechanisms 732 includes inner and outer plate portions 734 and 736, respectively, that are separated by an elastomeric center portion 738. The elastomeric center portion 738 is formed from natural rubber or some other elastomeric material. One surface of the elastomeric center portion 738 is bonded to the inner plate portion 734 and an opposite surface of the elastomeric center portion is bonded to the outer plate portion 736.

The elastomeric center portions 738 of the mechanisms 732 have material properties similar to those described above with reference to the second elastomeric ring 184 of FIGS. 4 and 5. Specifically, each of the elastomeric center portions 738 has a substantially high articulation stiffness, a substantially high radial stiffness, and a low axial stiffness. The substantially high articulation stiffness of the elastomeric center portions 738 of the mechanisms 732 acts to block substantially tilting of the air bag module 702 relative to the hub portion 704.

The inner plate portion 734 of each mechanism 732 is fixed for movement with the reaction plate 722 of the air bag module 720. The outer plate portion 736 of each mechanism 732 is fixed relative to the hub portion 704 of the steering wheel 702. FIG. 14 illustrates the outer plate portions 736 being fixed to the foam portions 708 and 710 of the first and second spokes 712 and 714 at locations spaced away from the hub portion 704 of the steering wheel 702. The outer plate portions 736 may be extended downwardly, as viewed in FIG. 14, to engage the hub portion 704 of the steering wheel 702 when additional support is needed for fixing the outer plate portions against movement relative to the hub portion.

Vehicle electronics 746 are located on an upper surface 748 of the hub portion 704 of the steering wheel 702 in a location immediately below the recessed central portion 724 of the reaction plate 722 of the air bag module 720. The vehicle electronics 746 include circuitry for an electric device of the vehicle, such as a vehicle horn.

A first contact of an electric switch 750 is connected to the vehicle electronics 746 and a second contact of the electric switch is connected to the reaction plate 722 of the air bag module 720. The electric switch 750 is normally in an open condition, as viewed in FIG. 14. The electric switch 750 is closed in response to the recessed central portion 724 of the reaction plate 722 of the air bag module 720 contacting the vehicle electronics 746.

When a force is applied to the cover 728 of the air bag module 720 to move the air bag module toward the hub portion 704 of the steering wheel 702, the elastomeric center portion 738 of each mechanism 732 is subjected to shearing stress. Specifically, the surface of each elastomeric center portion 738 that is bonded to the inner plate portion 734 moves downwardly, as viewed in FIG. 14, with the inner plate portion and relative to the opposite surface of the elastomeric center portion. During the downward movement of the air bag module 720 relative to the hub portion 704, the mechanisms 732 tend to limit movement of the air bag module 720 relative to the hub portion 704 of the steering wheel 702 to linear movement in a direction parallel to axis A, regardless of the location of the applied force. More particularly, the elastomeric center portions 738 tend to restrain the inner plate portions 734 against movement toward or away from the outer plate portions 736 during movement of the air bag module 720 relative the hub portion 704 of the steering wheel 702. As a result, the mechanisms 732 tend to block tilting of the air bag module 720 relative to the steering wheel 702.

FIG. 15 is a view, partially in section, of a portion of an apparatus 800 constructed in accordance with a ninth embodiment of the present invention and illustrated in a first position. The apparatus 800 includes a steering wheel 802. FIG. 15 illustrates a hub portion 804 of an armature 806 of the steering wheel 802.

The apparatus 800 also includes an air bag module 820. The air bag module 820 includes a reaction plate 822 having a recessed central portion 824 that is surrounded by an annular outer portion 826. A cover 828 for the air bag module 820 is attached to the reaction plate 822.

The apparatus 800 also includes a mechanism 832 for mounting the air bag module 820 to the steering wheel 802 in a manner that enables the air bag module to move relative to the hub portion 804 of the steering wheel. The mechanism 832 includes first and second annular sleeves 834 and 836, respectively, an elastomeric ring 840, and a guide member 842.

The first and second annular sleeves 834 and 836 preferably are formed from steel. The first annular sleeve 834 has a diameter that is larger than the diameter of the second annular sleeve 836. The first annular sleeve 834 includes inner and outer surfaces 848 and 850, respectively, and first and second ends 852 and 854, respectively. The second end 854 of the first annular sleeve 834 is fixed to an upper surface 858 of the hub portion 804 of the steering wheel 802. The second annular sleeve 836 also includes inner and outer surfaces 862 and 864, respectively, and first and second ends 866 and 868, respectively. The first end 866 of the second annular sleeve 836 is fixed to the annular outer portion 826 of the reaction plate 822 of the air bag module 820.

The elastomeric ring 840 preferably is formed from natural rubber or some other elastomeric material. The elastomeric ring 840 includes radially inner and outer surfaces 872 and 874, respectively. The radially inner surface 872 of the elastomeric ring 840 is bonded to the outer surface 864 of the second annular sleeve 836 in a location adjacent the second end 868. The radially outer surface 874 of the elastomeric ring 840 is bonded to the inner surface 848 of the first annular sleeve 834 in a location adjacent the first end 852.

The elastomeric ring 840 has material properties similar to those described above with reference to the second elastomeric ring 184 of FIGS. 4 and 5. Specifically, the elastomeric ring 840 has a substantially high articulation stiffness, a substantially high radial stiffness, and a low axial stiffness. The substantially high articulation stiffness of the elastomeric ring 840 acts to block substantially tilting of the air bag module 820 relative to the hub portion 804.

Figure 16:
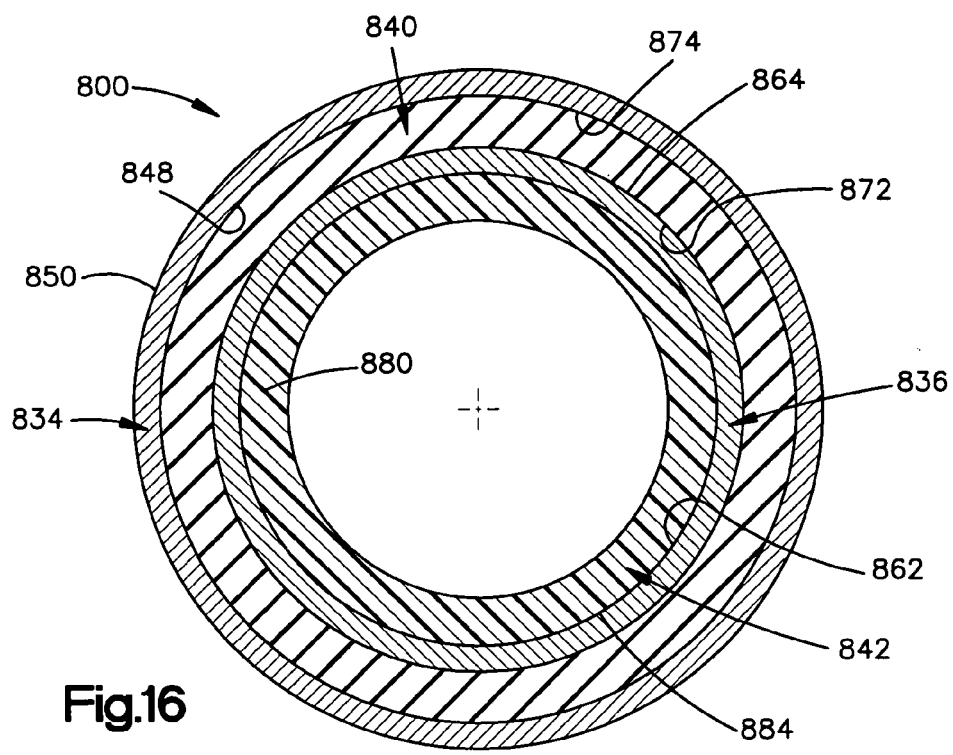
FIG. 16 is a view taken along line 16-16 of FIG. 15 and illustrates a cutaway plan view of the apparatus of FIG. 15.

The guide member 842 is formed from plastic and is generally cup-shaped. The guide member 842 includes a cylindrical side wall 880 and a circular bottom wall 882. As best shown in FIG. 16, the side wall 880 of the guide member has an outer surface 884 with a diameter that is approximately equal to the diameter of the inner surface 862 of the second annular sleeve 836. The bottom wall 882 of the guide member 842 is fixed to the hub portion 804 of the steering wheel 802 in a location such that the side wall 880 of the guide member 842 and the second annular sleeve 836 are coaxial.

The mechanism 832 illustrated in FIG. 15 also includes a coil spring 888. The coil spring 888 has a small diameter end 890 for engaging the second end 868 of the second annular sleeve 836 and a large diameter end 892 for engaging the upper surface 858 of the hub portion 804 of the steering wheel 802.

Vehicle electronics (not shown) are associated with the hub portion 804 of the steering wheel 802 and the reaction plate 822 of the air bag module 820. The vehicle electronics include circuitry for an electric device of the vehicle, such as a vehicle horn.

A first contact of an electric switch 898 is connected to the hub portion 804 of the steering wheel 802 and a second contact of the electric switch is connected to the reaction plate 822 of the air bag module 820. The electric switch 898 is normally in an open condition, as viewed in FIG. 15. The electric switch 898 is closed when the first end 852 of the first annular sleeve 834, which is electrically connected to the hub portion 804 of the steering wheel 802, contacts the reaction plate 822 of the air bag module 820.

When a force is applied to the cover 828 of the air bag module 820 to move the air bag module toward the hub portion 804 of the steering wheel 802, the elastomeric ring 840 of the mechanism 832 is subjected to shearing stress. Specifically, the inner surface 872 of the elastomeric ring 840 that is bonded to the second annular sleeve 836 moves downwardly, as viewed in FIG. 15, with the air bag module 820 and relative to the outer surface 874 of the elastomeric ring, which is bonded to the first annular sleeve 834. Also, during the downward movement of the air bag module 820 relative to the hub portion 804, the guide member 842 guides the second annular sleeve 836.

During the downward movement of the air bag module 820 relative to the hub portion 804, the mechanism 832 tends to limit movement of the air bag module 820 relative to the hub portion 804 of the steering wheel 802 to linear movement in a direction parallel to axis A, regardless of the location of the applied force. More particularly, the elastomeric ring 840 tends to block tilting of the second annular sleeve 836 relative to the first annular sleeve 834 during movement of the air bag module 820 relative the hub portion 804 of the steering wheel 802. The interaction between the guide member 842 and the second annular sleeve 836 during the movement of the air bag module 820 relative the hub portion 804 of the steering wheel 802 also helps to block tilting of the second annular sleeve 836 relative to the first annular sleeve 834. As a result, the mechanism 832 tends to block tilting of the air bag module 820 relative to the steering wheel 802.

Figure 17:
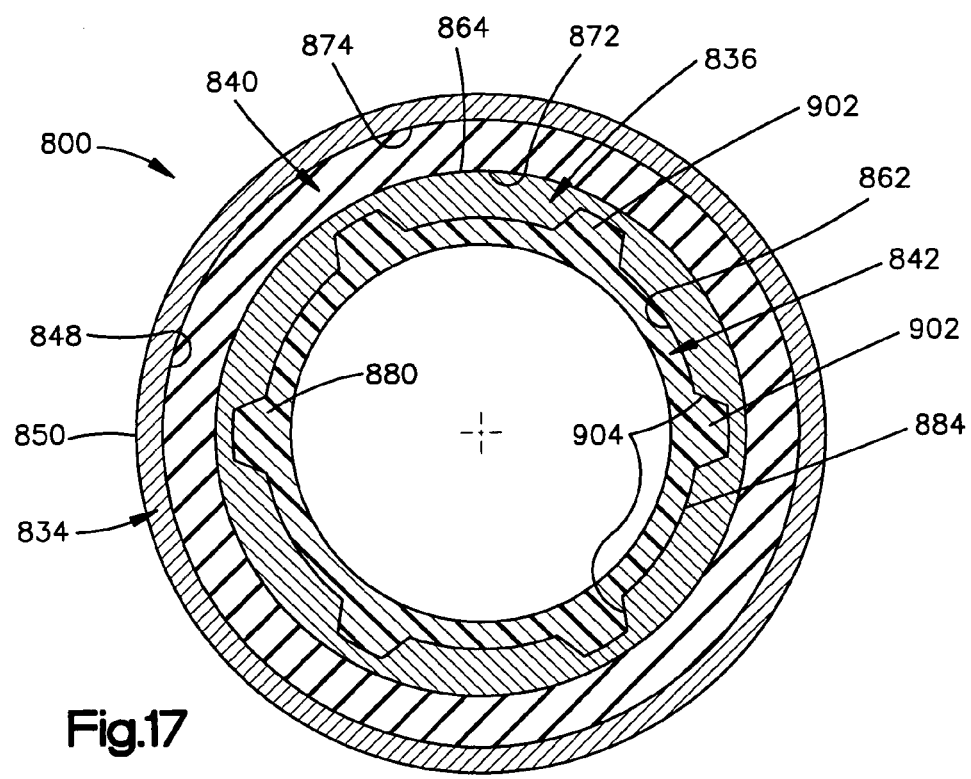
FIG. 17 illustrates an alternative cutaway plan view of the apparatus of FIG. 15.

FIG. 17 illustrates a cutaway view of an alternative version of the apparatus 800 of FIG. 15. As can be seen in FIG. 17, the outer surface 884 of the side wall 880 of the guide member 842 includes splines 902. The inner surface 862 of the second annular sleeve 836 includes grooves 904 for receiving the splines 902 of the guide member 842. The splines 902 of the guide member 842 interact with the second annular sleeve 836 to prevent rotation about axis A of the air bag module 820, to which the second annular sleeve 836 is fixed, relative to the steering wheel 802, to which the guide member 842 is fixed.

Figure 18:
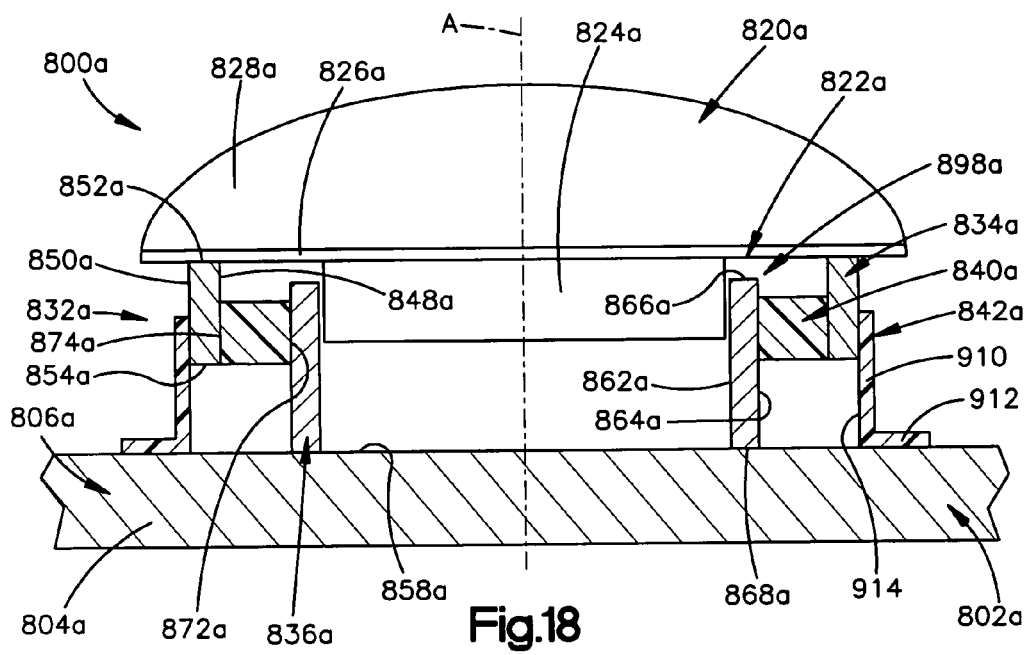
FIG. 18 is a view, partially in section, of a portion of an apparatus constructed in accordance with a tenth embodiment of the present invention and illustrated in a first position.

FIG. 18 is a view, partially in section, of a portion of an apparatus 800a constructed in accordance with a tenth embodiment of the present invention and illustrated in a first position. The apparatus 800a of FIG. 18 is similar to the apparatus 800 of FIG. 15 and operates in a manner similar to the apparatus of FIG. 15. Structures of the apparatus 800a of FIG. 18 that are the same as or similar to those of the apparatus 800 of FIG. 15 are labeled using the same reference numbers with the addition of the suffix "a".

The mechanism 832a of the apparatus 800a of FIG. 18 also includes the first and second annular sleeves 834a and 836a, respectively, the elastomeric ring 840a, and the guide member 842a. The guide member 842a includes a cylindrical side wall 910 and a radially outwardly extending flange 912. An inner surface 914 of the side wall 910 of the guide member 842a has a diameter that is approximately equal to the diameter of the outer surface 850a of the first annular sleeve 834a.

The first end 852a of the first annular sleeve 834a is fixed to the reaction plate 822a of the air bag module 820a so that the first annular sleeve 834a is fixed for movement with the air bag module. The second end 868a of the second annular sleeve 836a is fixed to the hub portion 804a of the steering wheel 802a. The inner surface 872a of the elastomeric ring 840a is bonded to the outer surface 864a of the second annular sleeve 836a and the outer surface 874a of the elastomeric ring is bonded to the inner surface 848a of the first annular sleeve 834a. The flange 912 of the guide member 842a is fixed to the hub portion 804a of the steering wheel 802a in a location coaxial with and surrounding the first annular sleeve 834a. When the guide member 842a is fixed to the hub portion 804a of the steering wheel 802a, the first annular sleeve 834a is received in the guide member 842a, as shown in FIG. 18.

Vehicle electronics (not shown) are associated with the hub portion 804a of the steering wheel 802a and the reaction plate 822a of the air bag module 820a. The vehicle electronics include circuitry for an electric device of the vehicle, such as a vehicle horn.

A first contact of an electric switch 898a is connected to the hub portion 804a of the steering wheel 802a and a second contact of the electric switch is connected to the reaction plate 822a of the air bag module 820a. The electric switch 898a is normally in an open condition, as viewed in FIG. 18. The electric switch 898a is closed when the first end 866a of the second annular sleeve 836a, which is electrically connected to hub portion 804a of the steering wheel 802a, contacts the reaction plate 822a of the air bag module 820a.

When a force is applied to the cover 828a of the air bag module 820a to move the air bag module toward the hub portion 804a of the steering wheel 802a, the elastomeric ring 840a of the mechanism 832a is subjected to shearing stress. Specifically, the outer surface 874a of the elastomeric ring 840 that is bonded to the first annular sleeve 834a moves downwardly, as viewed in FIG. 18, with the air bag module 820a and relative to the inner surface 872a of the elastomeric ring, which is bonded to the second annular sleeve 836a. Also, during the downward movement of the air bag module 820a relative to the hub portion 804a, the guide member 842a guides the first annular sleeve 834a.

During the downward movement of the air bag module 820a relative to the hub portion 804a, the mechanism 832a tends to limit movement of the air bag module 820a relative to the hub portion 804a of the steering wheel 802a to linear movement in a direction parallel to axis A, regardless of the location of the applied force. More particularly, the elastomeric ring 840a tends to block tilting of the first annular sleeve 834a relative to the second annular sleeve 836a during movement of the air bag module 820a relative the hub portion 804a of the steering wheel 802a. The interaction between the guide member 842a and the first annular sleeve 834a during the movement of the air bag module 820a relative the hub portion 804a of the steering wheel 802a also tends to block tilting of the first annular sleeve 834a relative to the second annular sleeve 836a. As a result, the mechanism 832a tends to block tilting of the air bag module 820a relative to the steering wheel 802a.

Figure 19:
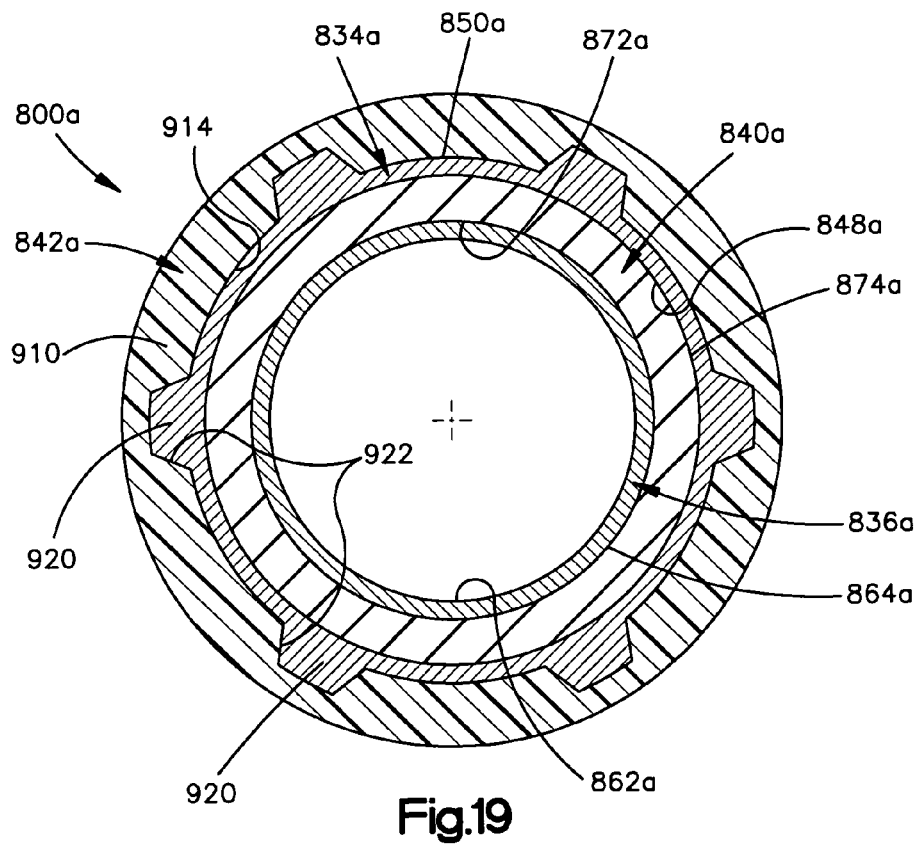
FIG. 19 illustrates an alternative cutaway plan view of the apparatus of FIG. 18.

FIG. 19 illustrates a cutaway view of an alternative version of the apparatus 800a of FIG. 18. As can be seen in FIG. 19, the outer surface 850a of the first annular sleeve 834a includes splines 920. The inner surface 914 of the guide member 842a includes grooves 922 for receiving the splines 920 of the first annular sleeve 834a. The splines 920 of the first annular sleeve 834a interact with the guide member 842a to prevent rotation about axis A of the air bag module 820a, to which the first annular sleeve is fixed, relative to the steering wheel 802a, to which the guide member is fixed.

Although the entire air bag module moves relative to the steering wheel for actuating the horn in each of the embodiments discussed above, a first portion of the air bag module may be fixed relative to the steering wheel and the mechanisms discussed above may be associated with a second portion of the air bag module that is movable relative to the steering wheel for actuating the horn. For example, the cover of the air bag module may be mounted to the steering wheel using one of more of the mechanisms while the remainder of the air bag module is fixed relative to the steering wheel. Movement of the cover relative to the steering wheel would actuate the horn.

An apparatus constructed in accordance with the present invention has significantly few components for enabling movement of the air bag module relative to the steering wheel for actuating the horn than previously known systems. The use of fewer components helps to simplify the assembly of the apparatus as compared to the previously known systems. Also, many of the components of the previously known systems that have been eliminated in the apparatus of the present invention have large manufacturing tolerances that increase the tendency of the air bag module to tilt relative to the steering wheel. As a result, the apparatus of the present invention enables the gaps that separate the air bag module and the steering wheel to be decreased significantly as compared to the previously known systems.

From the above description of the invention, those skilled in the art will perceive improvements, changes, and modifications. For example, as one alternative to the fasteners previously disclosed, the fasteners may be bolts that are fixed relative to the steering wheel using nuts. Additionally, the switch for activating the horn may be any type of switch that is responsive to the relative movement between a portion of the air bag module and the steering wheel. For example, as an alternative to an electrical switch, the switch may be an optic switch, a Hall Effect switch, or a capacitance switch. Such improvements, changes, and modifications within the skill of the art are intended to be covered by the appended claims.

Having described the invention, the following is claimed:

1. An apparatus for a vehicle, the apparatus comprising:
   a steering wheel;
   a vehicle occupant protection device that is mounted to the steering wheel and is actuatable for helping to protect an occupant of the vehicle, at least a portion of the vehicle occupant protection device being movable relative to the steering wheel for actuating an electric device associated with the vehicle when a force is applied at any one of various locations on the vehicle occupant protection device; and
   a mechanism for substantially blocking tilt of the movable portion of the vehicle occupant protection device relative to the steering wheel during movement for actuating the electric device, the mechanism comprising:
   a boss formed as a portion of the steering wheel:
   a bushing supported in the boss; and
   a fastener that supports the movable portion on the steering wheel, the fastener being received by the bushing and having an outer surface that engages an inner surface of the bushing, the inner surface of the bushing and the outer surface of the fastener being dimensioned such that an interaction of the inner surface of the bushing and the outer surface of the fastener substantially blocks tilt of the movable portion of the vehicle occupant protection device.

2. The apparatus of claim 1 wherein the fastener is fixed for movement with the vehicle occupant protection device and the bushing is fixed relative to the steering wheel, the fastener moving relative to the bushing during movement of the movable portion of the vehicle occupant protection device relative to the steering wheel.

3. The apparatus of claim 1 wherein part of the movable portion of the vehicle occupant protection device forms a first contact of an electric switch and a part of the steering wheel forms a second contact of the electric switch, structure of the mechanism acting to bias the electric switch into an open condition.

4. The apparatus of claim 1 wherein the bushing is constructed at least partially of nylon.

5. The apparatus of claim 1 wherein the bushing is constructed of a material formed to include a low friction surface.

6. An apparatus for a vehicle, the apparatus comprising:
   a steering wheel;
   a vehicle occupant protection device that is mounted to the steering wheel and is actuatable for helping to protect an occupant of the vehicle, at least a portion of the vehicle occupant protection device being movable relative to the steering wheel for actuating an electric device associated with the vehicle when a force is applied at any one of various locations on the vehicle occupant protection device; and
   a mechanism for substantially blocking tilt of the movable portion of the vehicle occupant protection device relative to the steering wheel during movement for actuating the electric device, wherein the mechanism includes a fastener, an elastomeric member, and a sleeve, the elastomeric member being interposed between the fastener and the sleeve and having a first surface that is bonded to the fastener and a second surface that is bonded to the sleeve, the elastomeric member enabling linear movement between the sleeve and the fastener and substantially blocking tilting of the sleeve relative to the fastener.

7. The apparatus of claim 6 wherein the elastomeric member is a roll bushing that is formed about an annular insert.

8. The apparatus of claim 6 wherein the sleeve is fixed relative to a first one of the movable portion of the vehicle occupant protection device and the steering wheel and the fastener is fixed relative to a second one of the movable portion of the vehicle occupant protection device and the steering wheel.

9. The apparatus of claim 6 wherein the elastomeric member is a first elastomeric ring of the mechanism, the mechanism also including a second elastomeric ring that is axially spaced from the first elastomeric ring, the second elastomeric ring also being interposed between and bonded to the fastener and the sleeve.

10. The apparatus of claim 6 wherein the sleeve is press fit in a recessed portion of a reaction plate of the vehicle occupant protection device and the fastener is fixed relative to a hub portion of the steering wheel.

11. The apparatus of claim 10 wherein a head portion of the fastener is located on a side of the reaction plate opposite the hub portion of the steering wheel when the fastener is fixed relative to the hub portion and the sleeve is press fit in the recess portion of the reaction plate, a shank portion of the fastener extending through an aperture in the reaction plate and being secured to the hub portion.

12. An apparatus for a vehicle, the apparatus comprising:
    a steering wheel;
    a vehicle occupant protection device that is mounted to the steering wheel and is actuatable for helping to protect an occupant of the vehicle, at least a portion of the vehicle occupant protection device being movable relative to the steering wheel for actuating an electric device associated with the vehicle when a force is applied at any one of various locations on the vehicle occupant protection device; and
    a mechanism for substantially blocking tilt of the movable portion of the vehicle occupant protection device relative to the steering wheel during movement for actuating the electric device, wherein the mechanism includes a fastener having a shank portion with a non-cylindrical outer surface, an aperture in the hub portion of the steering wheel having a shape that corresponds with the non-cylindrical outer surface of the shank portion, whereby the shank portion of the fastener and the hub portion of the steering wheel cooperate to prevent rotation of the fastener within the aperture.

13. An apparatus for a vehicle, the apparatus comprising:
    a steering wheel;
    a vehicle occupant protection device that is mounted to the steering wheel and is actuatable for helping to protect an occupant of the vehicle, at least a portion of the vehicle occupant protection device being movable relative to the steering wheel for actuating an electric device associated with the vehicle when a force is applied at any one of various locations on the vehicle occupant protection device; and
    a mechanism for substantially blocking tilt of the movable portion of the: vehicle occupant protection device relative to the steering wheel during movement for actuating the electric device, a part of the movable portion of the vehicle occupant protection device forming a first contact of an electric switch and a part of the steering wheel forming a second contact of the electric switch, structure of the mechanism acting to bias the electric switch into an open condition,
    wherein the structure of the mechanism that acts to bias the electric switch into the open condition is an elastomeric portion of the mechanism, the elastomeric portion being subjected to shearing stress for closing the electric switch, resiliency of the elastomeric portion returning the switch to the open condition.

14. An apparatus for a vehicle, the apparatus comprising:
a steering wheel;
a vehicle occupant protection device that is mounted to the steering wheel and is actuatable for helping to protect an occupant of the vehicle, at least a portion of the vehicle occupant protection device being movable relative to the steering wheel for actuating an electric device associated with the vehicle; and
a mechanism for limiting movement of the movable portion of the vehicle occupant protection device relative to the steering wheel to substantially linear movement, the mechanism comprising a first member that is fixed to the vehicle occupant protection device, a second member that is fixed to the steering wheel, and an elastomeric member that is interposed between and bonded to the first and second members, the elastomeric member enabling linear movement between the first and second members and substantially blocking tilting between the first and second members.

15. The apparatus of claim 14 wherein the elastomeric member includes a metallic sleeve, the metallic sleeve increasing an articulation stiffness of the elastomeric member for helping to block tilting between the first and second members.

* * * * *